US012575478B2

(12) United States Patent
Yao et al.

(10) Patent No.: US 12,575,478 B2
(45) Date of Patent: Mar. 17, 2026

(54) METHODS AND DEVICES FOR BIOMIMETIC HYGROMORPHIC COMPOSITE

(71) Applicant: CARNEGIE MELLON UNIVERSITY, Pittsburgh, PA (US)

(72) Inventors: Lining Yao, Pittsburgh, PA (US); Danli Luo, Pittsburgh, PA (US); Jianzhe Gu, Pittsburgh, PA (US); Fang Qin, Pittsburgh, PA (US); Guanyun Wang, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 1011 days.

(21) Appl. No.: 17/718,232

(22) Filed: Apr. 11, 2022

(65) Prior Publication Data

US 2022/0322599 A1     Oct. 13, 2022

Related U.S. Application Data

(60) Provisional application No. 63/190,844, filed on May 20, 2021, provisional application No. 63/173,051, filed on Apr. 9, 2021.

(51) Int. Cl.
*A01C 7/00* (2006.01)
*A01B 79/02* (2006.01)
*A01C 21/00* (2006.01)

(52) U.S. Cl.
CPC .............. *A01C 7/006* (2013.01); *A01B 79/02* (2013.01); *A01C 21/00* (2013.01)

(58) Field of Classification Search
CPC ........... A01C 7/006; A01C 7/00; A01C 21/00; A01B 79/02; A01B 79/00
See application file for complete search history.

(56) References Cited

FOREIGN PATENT DOCUMENTS

CN          111822301 A   * 10/2020   ........... B05D 3/0236

OTHER PUBLICATIONS

Pandolfi, C. et al. "Self-burial mechanism of erodium cicutarium and its potential application for subsurface exploration." In Conference on Biomimetic and Biohybrid Systems, pp. 384-385. Springer, Berlin, Heidelberg, 2012.

Rasmussen, M. et al. "Shape-changing interfaces: a review of the design space and open research questions." In Proceedings of the SIGCHI Conference on Human Factors in Computing Systems, pp. 735-744. 2012.

Wang, G. et al. "Printed paper actuator: A low-cost reversible actuation and sensing method for shape changing interfaces." In Proceedings of the 2018 CHI Conference on Human Factors in Computing Systems, pp. 1-12. 2018.

Forman, J. et al. "Modifiber: Two-way morphing soft thread actuators for tangible interaction." In Proceedings of the 2019 CHI Conference on Human Factors in Computing Systems, pp. 1-11. 2019.

(Continued)

*Primary Examiner* — Christopher J. Novosad

(74) *Attorney, Agent, or Firm* — Chiara F. Orsini; David G. Oberdick

(57)          ABSTRACT

The present invention comprises an artificial seed device, a drilling process for the artificial seed device and a fabrication method for the artificial seed device.

17 Claims, 30 Drawing Sheets

(56) References Cited

OTHER PUBLICATIONS

Ou, J. et al. "aeroMorph-heat-sealing inflatable shape-change materials for interaction design." In Proceedings of the 29th Annual Symposium on User Interface Software and Technology, pp. 121-132. 2016.

Yao, L. et al. "PneUI: pneumatically actuated soft composite materials for shape changing interfaces." In Proceedings of the 26th annual ACM symposium on User interface software and Technology, pp. 13-22. 2013.

Kan, V. et al. "Organic primitives: synthesis and design of pH-reactive materials using molecular I/O for sensing, actuation, and interaction." In Proceedings of the 2017 CHI conference on human factors in computing systems, pp. 989-1000. 2017.

Yao, L. et al. "BioLogic: natto cells as nanoactuators for shape changing interfaces." In Proceedings of the 33rd Annual ACM Conference on Human Factors in Computing Systems, pp. 1-10. 2015.

Mayton, B. et al. "The networked sensory landscape: Capturing and experiencing ecological change across scales." Presence 26, No. 2 (2017): 182-209.

Poupyrev, I. et al. "Botanicus Interacticus: interactive plants technology." In ACM SIGGRAPH 2012 Emerging Technologies, pp. 1-1. 2012.

Dublon, G. et al. "Listentree: audio-haptic display in the natural environment." Georgia Institute of Technology, 2014.

Ikeda, N. et al. "Soil-Monitoring Sensor Powered by Temperature Difference between Air and Shallow Underground Soil." Proceedings of the ACM on Interactive, Mobile, Wearable and Ubiquitous Technologies 4, No. 1 (2020): 1-22.

Nagahage, E. et al. "Calibration and validation of a low-cost capacitive moisture sensor to integrate the automated soil moisture monitoring system." Agriculture 9, No. 7 (2019): 141.

Kojima, Y. et al. "Low-cost soil moisture profile probe using thin-film capacitors and a capacitive touch sensor." Sensors 16, No. 8 (2016): 1292.

Li, S. et al. "Plant-inspired adaptive structures and materials for morphing and actuation: a review." Bioinspiration & biomimetics 12, No. 1 (2016): 011001.

Ko, A. et al. "Process of 3D wireless decentralized sensor deployment using parsing crossover scheme." Applied Computing and Informatics 11, No. 2 (2015): 89-101.

Ruggeberg, M. et al. "Bio-inspired wooden actuators for large scale applications." PloS one 10, No. 4 (2015): e0120718.

Gronquist, P. et al. "Analysis of hygroscopic self-shaping wood at large scale for curved mass timber structures." Science advances 5, No. 9 (2019): eaax1311.

Holstov, A. et al. "Hygromorphic materials for sustainable responsive architecture." Construction and Building Materials 98 (2015): 570-582.

Krieg, Oliver David. "HygroSkin—meteorosensitive pavilion." In Advancing Wood Architecture, pp. 125-140. Routledge, 2016.

Zhao, D. et al. "High-strength and high-toughness double-cross-linked cellulose hydrogels: a new strategy using sequential chemical and physical cross-linking." Advanced Functional Materials 26, No. 34 (2016): 6279-6287.

Song, J. et al. "Processing bulk natural wood into a high-performance structural material." Nature 554, No. 7691 (2018): 224-228.

Frey, M. et al. "Tunable wood by reversible interlocking and bioinspired mechanical gradients." Advanced science 6, No. 10 (2019): 1802190.

Xiao, S. et al. "Lightweight, strong, moldable wood via cell wall engineering as a sustainable structural material." Science 374, No. 6566 (2021): 465-471.

Shin, B. et al. "Hygrobot: A self-locomotive ratcheted actuator powered by environmental humidity." Science robotics 3, No. 14 (2018): eaar2629.

* cited by examiner

FIG. 2A

Natural *Erodium Gruinim* Seed

0min     3min     5min     7min     20min

FIG. 2B

Artificial Seed 100

0min     3min     5min     7min     20min

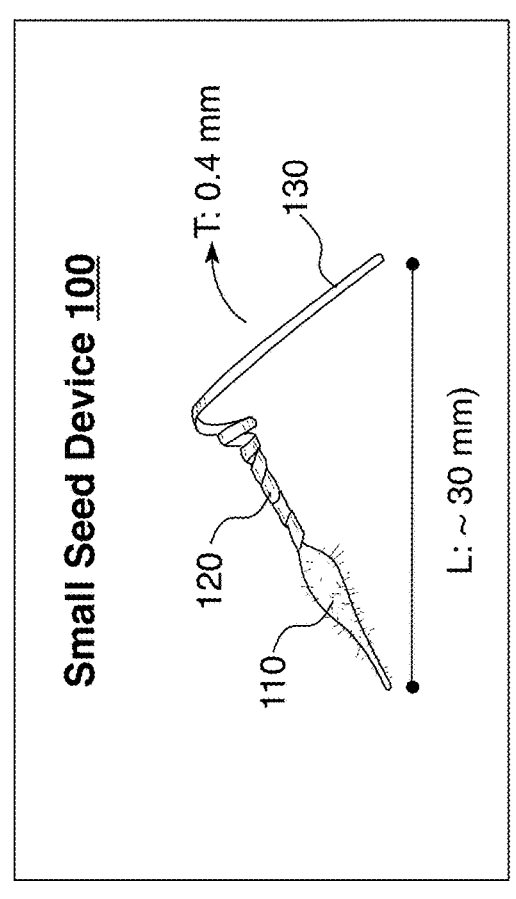
**Natural *Erodium* Seed**
FIG. 6A
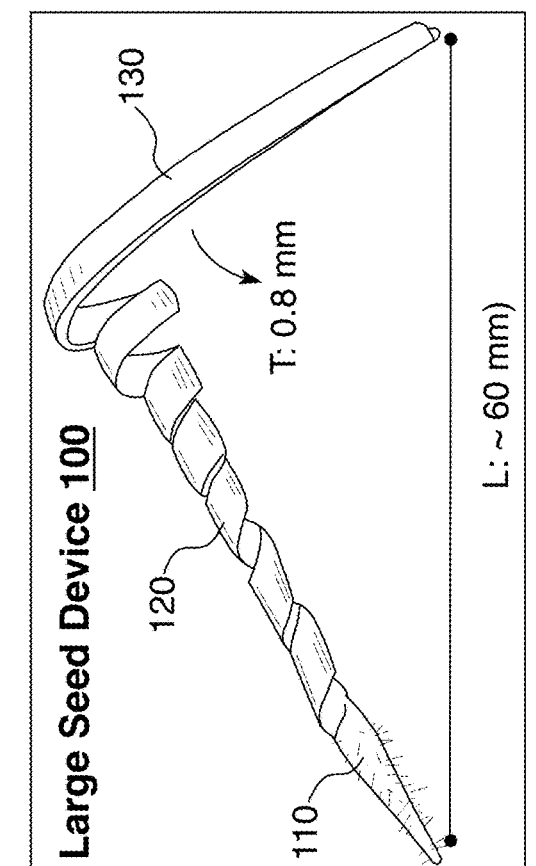
Small Seed Device 100
FIG. 6B
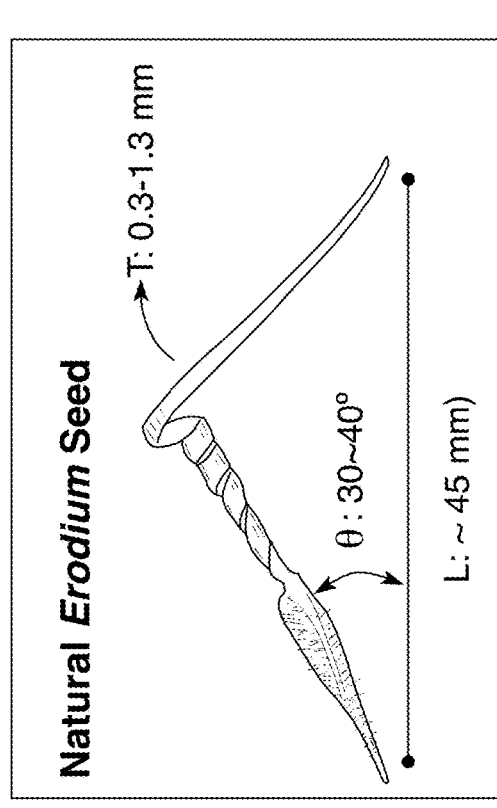
Medium Seed Device 100
FIG. 6C
Large Seed Device 100
FIG. 6D

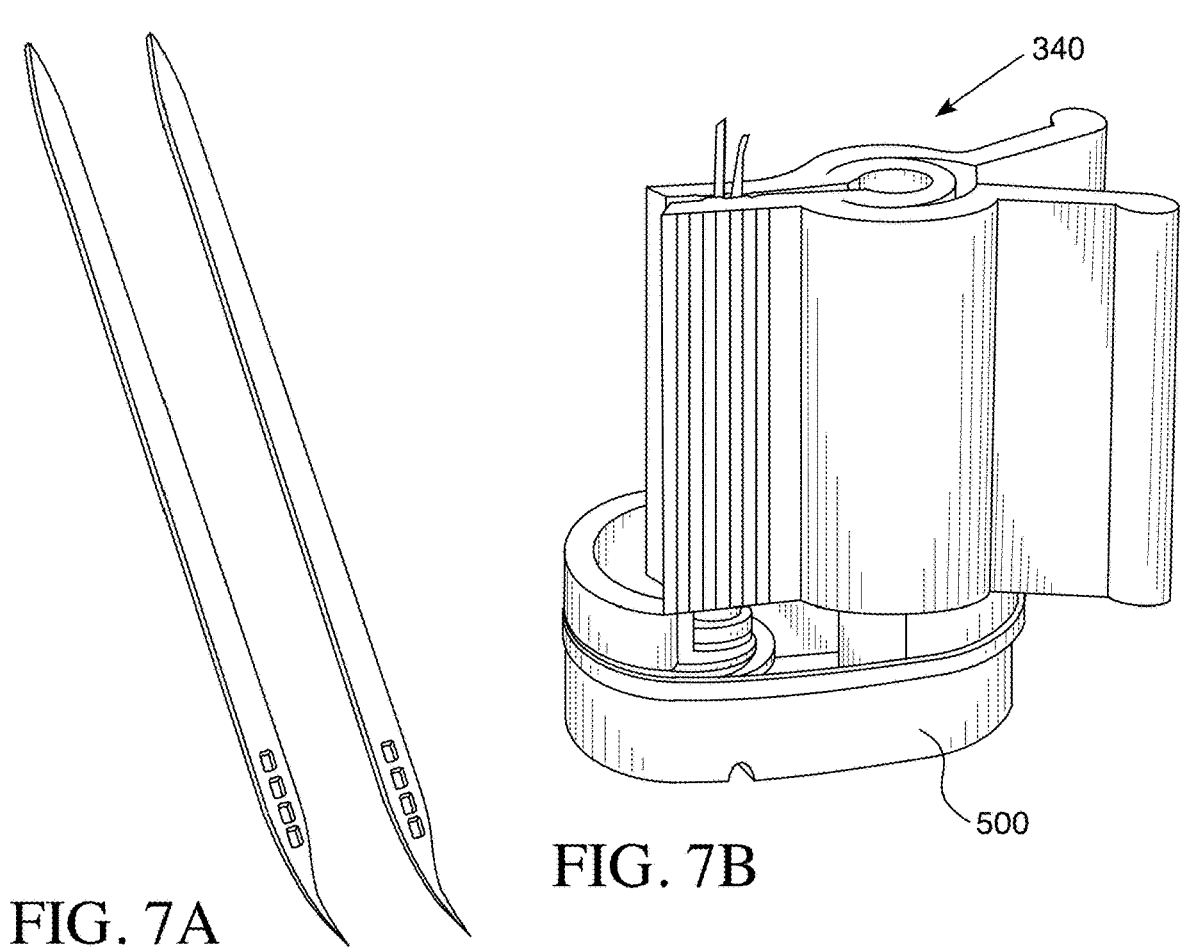
FIG. 7A
FIG. 7B
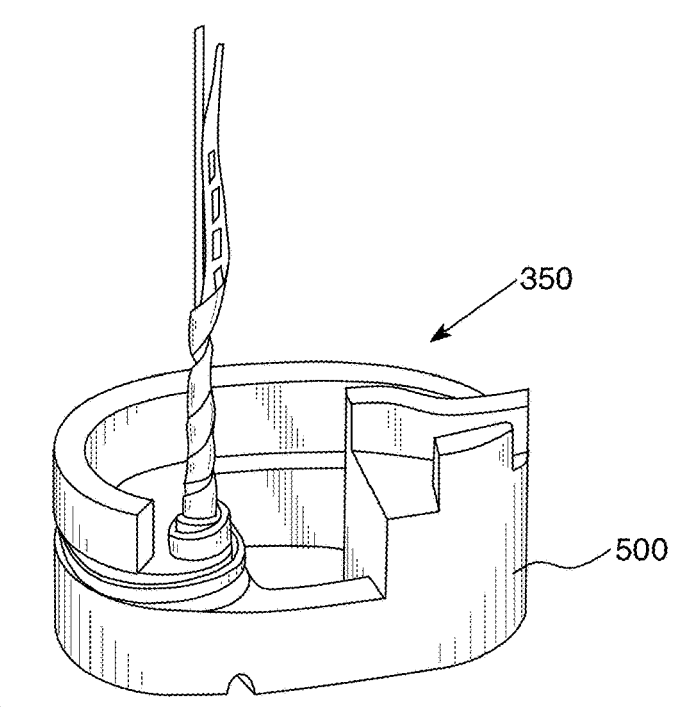
FIG. 7C

Seed Device 100 after drilling

Seed Device 100 before drilling

Small Seed Device 100

Medium Seed Device 100

Large Seed Device 100

| | | Tree Type | | |
|---|---|---|---|---|
| | | White Oak | Hard Maple | Bamboo |
| Factor | P | 755 kg/m$^3$ | 705 kg/m$^3$ | 500 - 800 kg/m$^3$ |
| | E$_{bend}$ | 102.3 MPa | 109 MPa | 168.6 MPa |
| | E | 12.15 GPa | 12.62 GPa | 20 GPa |
| | $\Delta^T$ | 10.5% | 9.9% | 15 - 17% |
| | Grain/ Texture | Straight, Coarse Uneven | Straight Mixed with Wavy Grain; Fine, even Texture | No Growth Ring, Very Uniform |

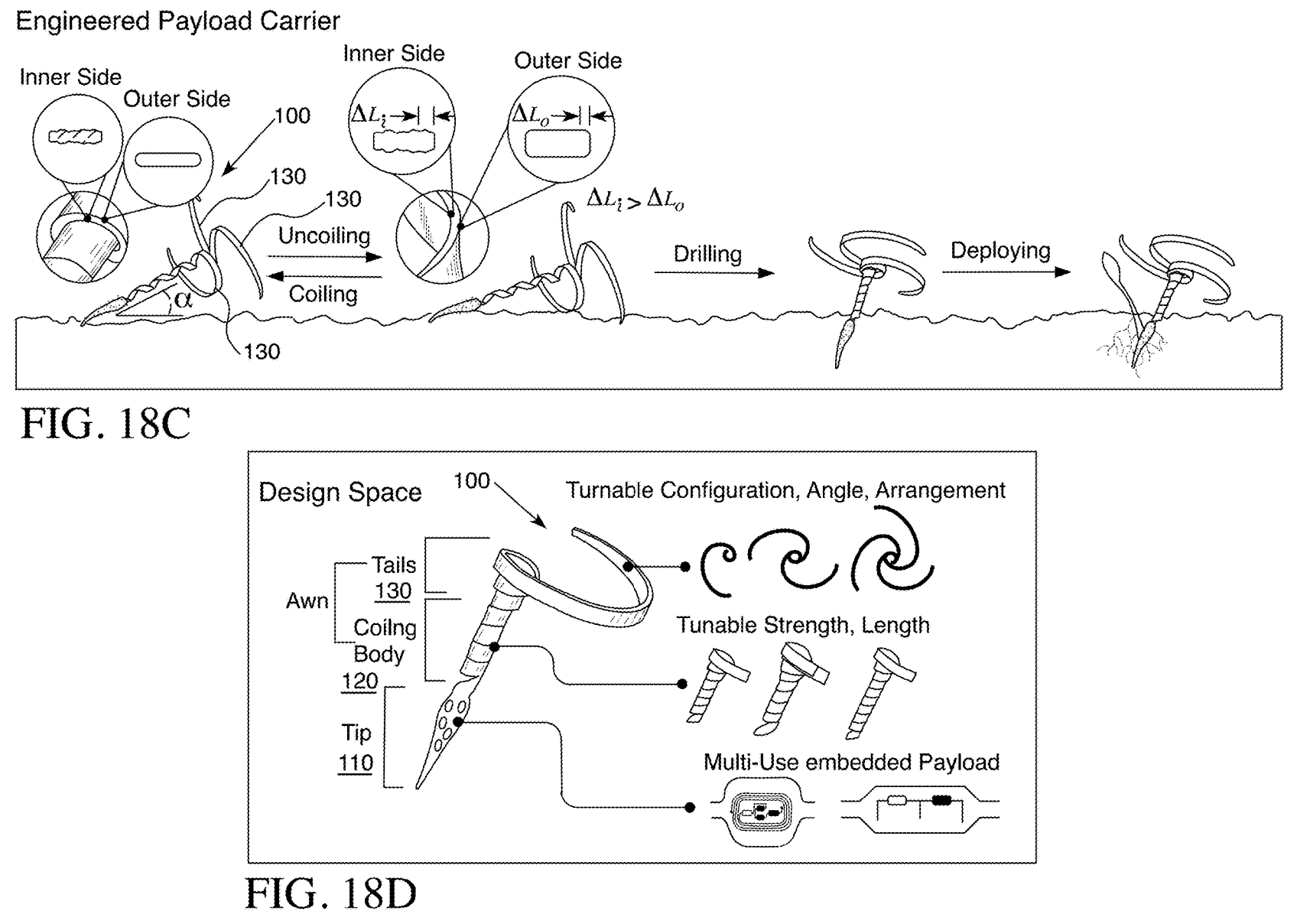

Engineered Payload Carrier

Inner Side   Outer Side

100

130

130

130

130

Uncoiling

Coiling $\alpha$

Inner Side   Outer Side $\Delta L_i$   $\Delta L_o$ $\Delta L_i > \Delta L_o$

Drilling

Deploying

FIG. 18D

Design Space

100

Awn

Tails
130

Coiling
Body
120

Tip
110

Turnable Configuration, Angle, Arrangement

Tunable Strength, Length

Multi-Use embedded Payload

2 Marigold Seeds Embede

110

120

After 56 hours

METHODS AND DEVICES FOR BIOMIMETIC HYGROMORPHIC COMPOSITE

CROSS-REFERENCE TO RELATED APPLICATION

This application claims priority to U.S. Provisional Application Ser. No. 63/173,051, filed on Apr. 9, 2021 and U.S. Provisional Application Ser. No. 63/190,844, filed on May 20, 2021, both of which applications are incorporated by reference herein in their entirety.

BACKGROUND OF THE INVENTION

Fields of the Invention

The present invention relates to the fields of biomimetic seeds and to biomimetic hygromorphic materials. The present invention also relates to the fields of human-computer interfaces for farming and human-nature interactions. This present invention addresses problems in these fields by developing an autonomous, fully biodegradable (in certain embodiments) payload carrier that drills itself into the soil at the perfect moment without human effort. The actuation of this artificial carrier device can self-power using energy solely from the natural surroundings in the form of rainfalls and diurnal humidity fluctuation.

Description of Related Art

Bringing state-of-the-art sensors, actuators, and interactive devices outdoors and into the wild (e.g., farmland, forests, and wetlands) raises new challenges, such as effectively deploying such devices on a large scale and creating ubiquitous computing that can weave itself into nature seamlessly. Existing works show that the deployment of sensors and other functional devices over large, distributed areas is non-trivial, especially when these areas are remote and hard to reach. See Albert H R Ko and François Gagnon. 2015. Process of 3D wireless decentralized sensor deployment using parsing crossover scheme (Applied Computing and Informatics 11, 2: 89-101. https://doi.org/10.1016/j.aci.2014.11.001 (last accessed Apr. 11, 2022)). For example, to deploy a wireless sensor network and monitor agricultural activities, one needs to consider the depth of deployment, the exact locations of deployed sensors, and the constant battle of low-costs and energy efficiency vs. large-scale deployment and environmental impact. Most of the work done in this field involved manual sensor installation.

The methods and devices of the present invention address these unique challenges in the field by designing a functional platform that is energy-efficient to deploy in large quantities, lightweight to accommodate aerial deployment, and biodegradable or easily retrievable to minimize the environmental impact. In addition, the technology of the present invention is both versatile and general enough for various needs, including sensing, soil sampling, and interactive experiences.

Rewilding of land today is a slow, manual process that suffers from low rates of seed establishment and high costs. Indiscriminate scattering of seeds on the surface of the soil lends itself to predation by birds or drying out due to harsh ambient conditions. On the other hand, manual plantation requires tremendous manpower, hours of effort and considerable resources, making the process cost prohibitive. When it comes to the restoration of burned, destroyed or remote landscapes, environmentalists and restoration crews are posed with significant health and safety risks, in the form of inaccessible terrain, steep slopes, residual flames, smoldering remains and unstable hazard trees on the forest floor. Establishing seedings for environmental conservation also is concerned with additional soil micro-environment that helps the seedling thrive and survive in the wilderness. However, it is tedious to sow the seeds and establish micro-environment post-seeding.

In the context of modern agriculture, the challenge lies with uncompromising planting timelines defined by rainfall regimes that are critical for successful seeding and germination. Growers need to wait for optimal weather and soil conditions, which can often vary, to plant their seeds. Premature or late burial of seeds in the soil can lead to rot, leading to crop failure.

With the increased concern about environmental degradation attributed to human activities, nowadays humans are trying to build a more sustainable future. Li et al. summarized some popular theories of the symbiotic encounter between farmers, or researchers, and nature. See Suyi Li and K W Wang. 2016, Plant-inspired adaptive structures and materials for morphing and actuation: a review (Bioinspiration & biomimetics 12, 1: 11001. https://doi.org/10.1088/1748-3190/12/1/011001 (last accessed Apr. 11, 2022)). They conducted in-depth interviews with local farmers and confirmed that the best use of HCI in the farming industry is to democratize innovation and technology as well as technologies that disseminate methods.

As such, soil sensors that focus on low-cost capacitive sensing techniques were developed. See Yuki Kojima, Ryo Shigeta, Naoya Miyamoto, Yasutomo Shirahama, Kazuhiro Nishioka, Masaru Mizoguchi, and Yoshihiro Kawahara (2016) Low-Cost Soil Moisture Profile Probe Using Thin-Film Capacitors and a Capacitive Touch Sensor (Sensors 16, 1292 at https://doi.org/10.3390/s16081292 (last accessed Apr. 11, 2022)) and Ekanayaka Achchillage Ayesha Dilrukshi Nagahage, Isura Sumeda Priyadarshana Nagahage, and Takeshi Fujino (2019) Calibration and Validation of a Low-Cost Capacitive Moisture Sensor to Integrate the Automated Soil Moisture Monitoring System (Agriculture 9, 141 at https://doi.org/10.3390/agriculture9070141 (last accessed Apr. 11, 2022)). Such sensors were still bulky and inorganic; on the other hand, other researchers were working on a battery-free, wireless solution to soil-monitoring sensors that harvests the energy from temperature fluctuation. See Natsuki Ikeda, Ryo Shigeta, Junichiro Shiomi, and Yoshihiro Kawahara (2020) Soil-Monitoring Sensor Powered by Temperature Difference between Air and Shallow Underground Soil (Proceedings of the ACM on Interactive, Mobile, Wearable and Ubiquitous Technologies 4, 1-22 at https://doi.org/10.1145/3380995 (last accessed Apr. 11, 2022)). Aside from sensing technology development, ListenTree is an example of creating or digitally augmenting interactive experiences with nature with an audio-haptic display embedded in trees. See Edwina Portocarrero, Gershon Dublon, Joseph Paradiso, Michael V. Bove, and V Michael Bove (2015) ListenTree: Audio-haptic display in the natural environment (In Proceedings of the 33rd Annual ACM Conference Extended Abstracts on Human Factors in Computing Systems (CHI EA '15), 395-398 at https://doi.org/10.1145/2702613.2725437 (last accessed Apr. 11, 2022)). Botanicus Interacticus showcased the fusion of computing power and plants, living or artificial, that exemplify a broader variety of responsive devices around human presence for expressive interaction. See Ivan Poupyrev, Philipp Schoessler, Jonas Loh, and Munehiko Sato (2012)

Botanicus Interacticus: interactive plants technology (ACM SIGGRAPH 2012 Emerging Technologies, 1 at https://doi.org/10.1145/2343456.2343460 (last accessed Apr. 11, 2022)). Besides technical advancement and democratization, Mayton and co-workers tried to boost understanding and experience of ecology. See Brian Mayton, Gershon Dublon, Spencer Russell, Evan F Lynch, Don Derek Haddad, Vasant Ramasubramanian, Clement Duhart, Glorianna Davenport, and Joseph A Paradiso (2017) The Networked Sensory Landscape: Capturing and Experiencing Ecological Change Across Scales (Presence: Teleoperators and Virtual Environments 26, 182-209 at https://doi.org/10.1162/pres_a_00292 (last accessed Apr. 11, 2022)). By deploying sensor networks to capture different ecological data, they advocated for environment restoration.

So far, the insertion, installation, or massive deployment of sensors remains laborious. The methods, systems and devices of the present invention address the needs and interests mentioned above, including both democratizing massive deployment of functional devices in the field and augmenting interactivities with nature.

Lately, researchers have been exploiting shape-changing materials as design media for interfaces in various ways, many of which are biomimetic or bio-derived. These interfaces respond to environmental stimuli and modulate the relationships between the space, the artifacts, and the human. For example, bioLogic uses hygromorphic Natto cells to produce biohybrid materials to be integrated in sweat responsive garments or steam-triggered tea leaves. See Lining Yao, Jifei Ou, Chin-Yi Yi Cheng, Helene Steiner, Wen Wang, Guanyun Wang, and Hiroshi Ishii (2015) bioLogic: Natto Cells as Nanoactuators for Shape Changing Interfaces (In Proceedings of the 33rd Annual ACM Conference on Human Factors in Computing Systems (CHI '15), 1-10 at https://doi.org/10.1145/2702123.2702611 (last accessed Apr. 11, 2022)). Organic Primitives derives hydrogel from seaweed to produce edible and shape changing materials. See Viirj Kan, Emma Vargo, Noa Machover, Hiroshi Ishii, Serena Pan, Weixuan Chen, and Yasuaki Kakehi (2017) Organic Primitives: Synthesis and Design of pH-Reactive Materials using Molecular I/O for Sensing, Actuation, and Interaction (In Proceedings of the Conference on Human Factors in Computing Systems (CHI '17), 989-1000 at https://doi.org/10.1145/3025453.3025952 (last accessed Apr. 11, 2022)). PneUI is inspired by soft body animals and presents transformable interfaces with elastomers. See Lining Yao, Ryuma Niiyama, Jifei Ou, Sean Follmer, Clark Della Silva, and Hiroshi Ishii (2013) PneUI: Pneumatically actuated soft composite materials for shape changing interfaces (In Proceedings of the 26th Annual ACM Symposium on User Interface Software and Technology (UIST '13), 13-22 at https://doi.org/10.1145/2501988.2502037 (last accessed Apr. 11, 2022)). Plants have also provided various morphing mechanisms and inspired the development of adaptive structures. See Suyi Li and K W Wang (2016) Plant-inspired adaptive structures and materials for morphing and actuation: a review (Bioinspiration & biomimetics 12, 1: 11001 at https://doi.org/10.1088/1748-3190/12/1/011001).

In addition to the tightly related biomimetic structures, there exist accumulated interface designs which sense and respond with shape changes. For example, aeroMorph, ModiFiber, and Printed Paper Actuator approached this topic from a functional perspective. See, respectively, Jifei Ou, Mélina Skouras, Nikolaos Vlavianos, Felix Heibeck, Chin-Yi Cheng, Jannik Peters, and Hiroshi Ishii (2016) aeroMorph—Heat-sealing Inflatable Shape-change Materials for Interaction Design (Proceedings of the 29th Annual Symposium on User Interface Software and Technology (UIST '16) at https://doi.org10.1145/2984511.298452) (last accessed Apr. 11, 2022); Jack Forman, Taylor Tabb, Youngwook Do, Meng Han Yeh, Adrian Galvin, and Lining Yao (2019) Modifiber: Two-way morphing soft thread actuators for tangible interaction (In Proceedings of the Conference on Human Factors in Computing Systems (CHI '19), 1-11 at https://doi.org/10.1145/3290605.3300890 (last accessed Apr. 11, 2022)); and Guanyun Wang, Tingyu Cheng, Youngwook Do, Humphrey Yang, Ye Tao, Jianzhe Gu, Byoungkwon An, and Lining Yao (2018) Printed paper actuator: A low-cost reversible actuation and sensing method for shape changing interfaces (In Proceedings of the Conference on Human Factors in Computing Systems (CHI '18), 1-12 at https://doi.org/10.1145/3173574.3174143 (last accessed Apr. 11, 2022)). Accessible fabrication techniques are also prevalent in shape-changing interfaces, some of which express bio-inspired shape changing.

There is limited development of helical and self-drilling interfaces in HCI, and, in the engineering world, both aspects are similarly faced with challenges. Rasmussen et al. systematically described different modalities of interaction of shape-changing interfaces. See Majken K. Rasmussen, Esben W. Pedersen, Marianne G. Petersen, and Kasper Hornbæk (2012) Shape-changing interfaces: a review of the design space and open research questions (In Proceedings of the conference on Human Factors in Computing Systems (CHI '12) (CHI '12), 735-744 at https://doi.org/10.1145/2207676.2207781 (last accessed Apr. 11, 2022)). The methods and devices of the present invention, in one preferred embodiment, provide (i) novel functionality with a very specific aim of drilling, (ii) a novel source of input (humidity change), and (iii) autonomous response. The biomimetic device of the present invention is a unique artificial organism interfacing between the open environment and the underground, which contributes to the broader scope of shaping changing interfaces in HCI.

Important to various embodiments of the present invention is the morphing structures of wood materials. Wood, as a cellulosic fibrous material, is naturally hygromorphic due to the composition. Because wood is widely available and mechanically durable, wood-based composite materials have been explored as a building block in computational design and 3D printing.

Also important to the various embodiments of the present invention are attributes of self-drilling Erodium seeds, which have been studied as inspirations for self-deploying and self-burying seeds and sensors that leverage natural energy stimuli. See, for example, C. Pandolfi, D. Comparini, S. Mancuso, in Biomimetic and Biohybrid Systems, T. J. Prescott, N. F. Lepora, A. Mura, P. F. M. J. Verschure, Eds. (Springer Berlin Heidelberg, Berlin, Heidelberg, 2012 at http://ilink.springer.com/10.1007/978-3-642-31525-1_53 (last accessed Apr. 11, 2022), vol. 7375 of Lecture Notes in Computer Science, pp. 384-3850; N. E. Stamp, Self-Burial Behaviour of Erodium Cicutarium Seeds. J. Ecol. 72, 611-620 (1984); R. Geer, S. Iannucci, S. Li, Pneumatic coiling actuator inspired by the awns of erodium cicutarium (Front. Robot. AI. 7 (2020), doi:10.3389/frobt.2020.00017); and G. M. Spinks, Advanced actuator materials powered by biomimetic helical fiber topologies. Adv. Mater. 1904093, 1-13 (2019). The body of the Erodium seed uncoils and coils reversibly by day-to-night humidity shifts or by rain cycles, as the tip carrying plant seeds starts to rotate with respect to the body and self-drills into the ground eventually. Previous studies of the Erodium seed behaviors include cellular structure, mechanics and modeling, as researchers envisioned that such an energy-efficient self-drilling mechanism can be used on earth and other planets for soil sampling and farming.

However, an engineered and biodegradable system of similar or better effectiveness is yet to be developed to reduce the effort of recycling, increase the size of mass production, and incorporate customizable payload that is beneficial to the local ecosystem. As itself a well-evolved self-drilling system, the natural *Erodium* seed has singular form factor, is not tailored to adapt to specific soil conditions, and is difficult to scale in production. Even if massive cultivation is considered, the payloads that need to be carried underground have to be installed after harvesting ripen seeds after many months of growth, which could be quite tedious. In terms of implementation, both synthetic and natural raw materials have been leveraged to engineer hygromorphic actuators. However, a lot of the synthetic hygromorphic materials have insufficient strength, small initial curvatures, limited actuation amplitude, and delayed response time. While some other composite materials have compelling strength and rapid response, they may require transient moisture gradient to trigger the actuation. In addition, most of these synthetic materials are not biodegradable and thus limit the natural application contexts. Biobased cellulosic materials such as wood have been explored as hygromorphic actuators for applications from architectural installations to biomimetic 4D printing of blossoming flowers. This is because wood exhibits anisotropic dimensional changes and has compelling mechanical strength. They typically suffer from limited initial curvature and actuation amplitude.

Nature has engineered hygromorphic seed dispersal and burial mechanisms that involve shape change due to moisture sorption from the environment. Inspired by *Erodium* seeds that can self-drill into the ground by leveraging the hygromorphic coiling and uncoiling of the helical awn, researchers have been envisioning the possibilities of self-drilling and self-deployable sensors by harvesting natural energy stimuli both on earth and in outer space. However, as previously discussed, a biodegradable and hygromorphic coiling actuator is challenging to engineer. Considering most synthetic hygroscopic materials are not biodegradable, or suffer from insufficient stiffness and actuation amplitude, the present invention is a simple yet effective strategy to transform natural wood veneer into biodegradable and strong hygromorphic actuators that can be easily molded into complex initial shapes in hydration state. The present invention, in certain embodiments, embodies engineered coiling actuators with an initial bending curvature of 2000 m-1 and actuation amplitude of 1350 m-1, which are 10 and 20 times larger than that of existing engineered hygromorphic actuators. Due to its flexibility in shaping hygromorphic actuators with large initial bending curvatures and actuation amplitude, low-cost, easy-accessibility and biodegradability, the methods and devices of the present invention can be broadly leveraged to manufacture biodegradable self-drilling carriers in the context of agricultural seeding, re-wildland, mountain reforestation after fire, and microorganism delivery to improve the ecology. In a field test, it has been demonstrated that the biomimetic payload-carrier device of the present invention can successfully self-drill triggered by natural rains and germinate seeds.

These unique challenges in the field are addressed by designing a functional platform that is energy-efficient to deploy in large quantities, lightweight to accommodate aerial deployment, and biodegradable or easily retrievable to minimize the environmental impact.

BRIEF SUMMARY OF THE INVENTION

As sensors and interactive devices become ubiquitous and transition outdoors and into the wild, the challenge of mass deployment and actuation arises. The methods and devices of the present invention, in one embodiment, comprise a biomimetic platform that consumes little power to deploy, harvests energy from nature to install, and functions autonomously in the field. Each seed device can individually self-drill into a substrate by harvesting moisture fluctuations in its ambient environment. As such, the various embodiments of the present invention act as shape-changing interfaces to autonomously embed functional devices and interfaces into the soil, with the potential of aerial deployment in hard-to-reach locations. Most embodiments of the present invention are constructed primarily from wood veneer, making them lightweight, inexpensive, and biodegradable. The present invention, in certain embodiments, also encompasses methods for fabricating these devices and applications that leverage the platform of the present invention, in these embodiments, as a self-drilling interface. Example applications include seed and other material distribution, soil sensors, sampling, and environmental monitoring for agriculture and reforestation.

To achieve these goals, certain embodiments of the present invention comprise an innovative material system that can autonomously self-drill into the ground by responding to either rainfall or relative humidity changes. A preferred embodiment of the actuation mechanism is inspired by the plant of the genus *Erodium* that deploys its seeds through a self-burial behavior. Despite the previous attempts to build *Erodium*-inspired engineering systems, a practical replica that resembles the architecture and function has yet to be developed. The various embodiments of the present invention can be leveraged by other Human-Computer Interaction ("HCI") endeavors when looking for suitable carriers for their sensors and interfaces that are arduous or resource-consuming to anchor.

One preferred embodiment of the present invention comprises a lightweight parametric design tool to help users to adjust and customize the shape of the device and ensure the designed artifacts can follow critical biodesign guidelines derived from nature. Another embodiment of the present invention is the use of the platform technology to design different functional devices and interfaces, through both electronic-free and digital applications. Additionally, the device of the present invention, in one embodiment, is the first biomimetic concept that is engineered to achieve a self-drilling effect for shape-changing interfaces.

One embodiment of the present invention is a device for self-drilling into a substrate for transport of a payload. The device of this embodiment comprises a body that coils and uncoils in response to changes in humidity, a tip attached at a first end of the body, at least one tail attached at a second end of the body; and a payload attached to or incorporated into at least one of the body, the tip and the at least one tail.

Another embodiment of the present invention is a method of implementation of a self-drilling device for transport of a payload. The method of this embodiment comprises selection of at least one device, the device comprising: (a) a body having a first end and a second end, wherein the body coils and uncoils in response to changes in humidity and the body is configured to generate a downward thrust force while coiling and uncoiling to drill the device into a crevice in a substrate, (b) a rigid and pointed tip attached at the first end of the body; and (c) at least one tail attached at the second end of the body, with the tail curved to provide support against the substrate to facilitate drilling. The method of this embodiment also comprises distributing the device onto the substrate in an environment having varying humidity, whereby, in response to changes in humidity, the coiling and uncoiling of device causes the device to: (a) search for a crevice in the substrate; (b) locate the crevice; (c) drill the device into the crevice; and (d) establish the device in the crevice.

Another embodiment of a method of the present invention is a method of making a device for self-drilling into a substrate, the device comprising a body, a tip attached to a first end of the body, and at least one tail attached to a second of the body, the body and at least one tail comprised of wood and configured to coil and uncoil in response to changes in humidity. The method of this embodiment comprises: (1) sheeting the wood to a thickness proportional to the length of the body; (2) cutting an outline of the body and at least one tail of the device from the sheeted wood; (3) washing the wood to achieve moldability; (4) molding the wood to a desired curvature; and (5) drying the wood. For this embodiment, the body and at least one tail are capable of coiling and uncoiling in response to changes in humidity.

Another embodiment of a device according to the present invention is a device for self-drilling into a substrate. The device of this embodiment comprises a body that coils and uncoils in response to changes in humidity, a tip attached at a first end of the body; and at least one tail attached at a second end of the body.

BRIEF DESCRIPTION OF THE SEVERAL VIEWS OF THE DRAWINGS

For the purpose of facilitating understanding of the invention, the accompanying drawings and description illustrate preferred embodiments thereof, from which the invention, various embodiments of its structures, construction, method of operation and many advantages may be understood and appreciated.

FIGS. 2A and 2B present a comparison of an *Erodium gruinum* seed and a one embodiment of a seed device according to the present invention;

FIGS. 6A through 6D illustrate the proportions of various seed devices of the present invention;

FIGS. 7A through 7C illustrates one embodiment of a fabrication process and associated devices according to the present invention;

FIG. 17 shows a table summarizing three wood candidates for making seed devices of the present invention;

FIGS. 18A through 18D illustrates the biomimetic design of one embodiment of a seed device according to the present invention;

DETAILED DESCRIPTION OF THE INVENTION

Figures 1A, 1B, 1C, 1D:
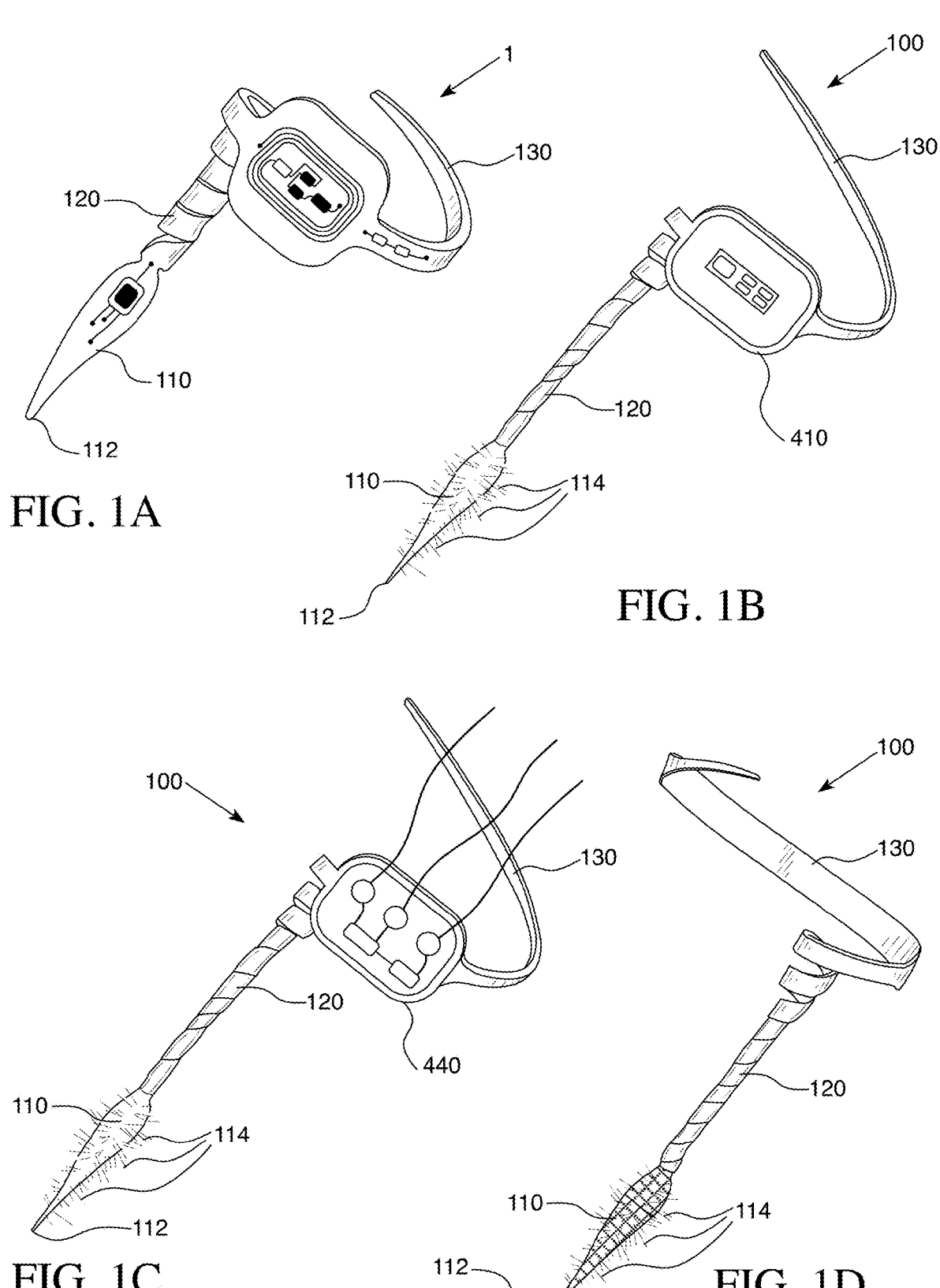
FIGS. 1A through 1D illustrate four embodiments of seed devices according to the present invention.

The present invention in various embodiments will be understood more readily by reference to the following detailed description of the invention and the accompanying figures, which form a part of this disclosure. This invention is not limited to the specific devices, methods, processes, elements or parameters described and/or shown herein and the terminology used herein is for the purpose of describing particular embodiments and is by way of example only and not intended to be limiting of the claimed invention. Any and all patents and other publications identified in this specification are incorporated by reference as though fully set forth herein. The following detailed descriptions should not be taken in a limiting sense. The accompanying figures and drawings are hereby incorporated by reference.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

It is to be understood that the invention may assume alternative variations and step sequences, except where expressly specified to the contrary. It also is to be understood that the specific devices and processes illustrated in the attached drawings and described in this specification are simply exemplary embodiments of the invention. Hence, specific dimensions and other physical characteristics related to the embodiments disclosed herein are not to be considered as limiting.

Biomimetic Seed Devices

Figures 2A, 2B:
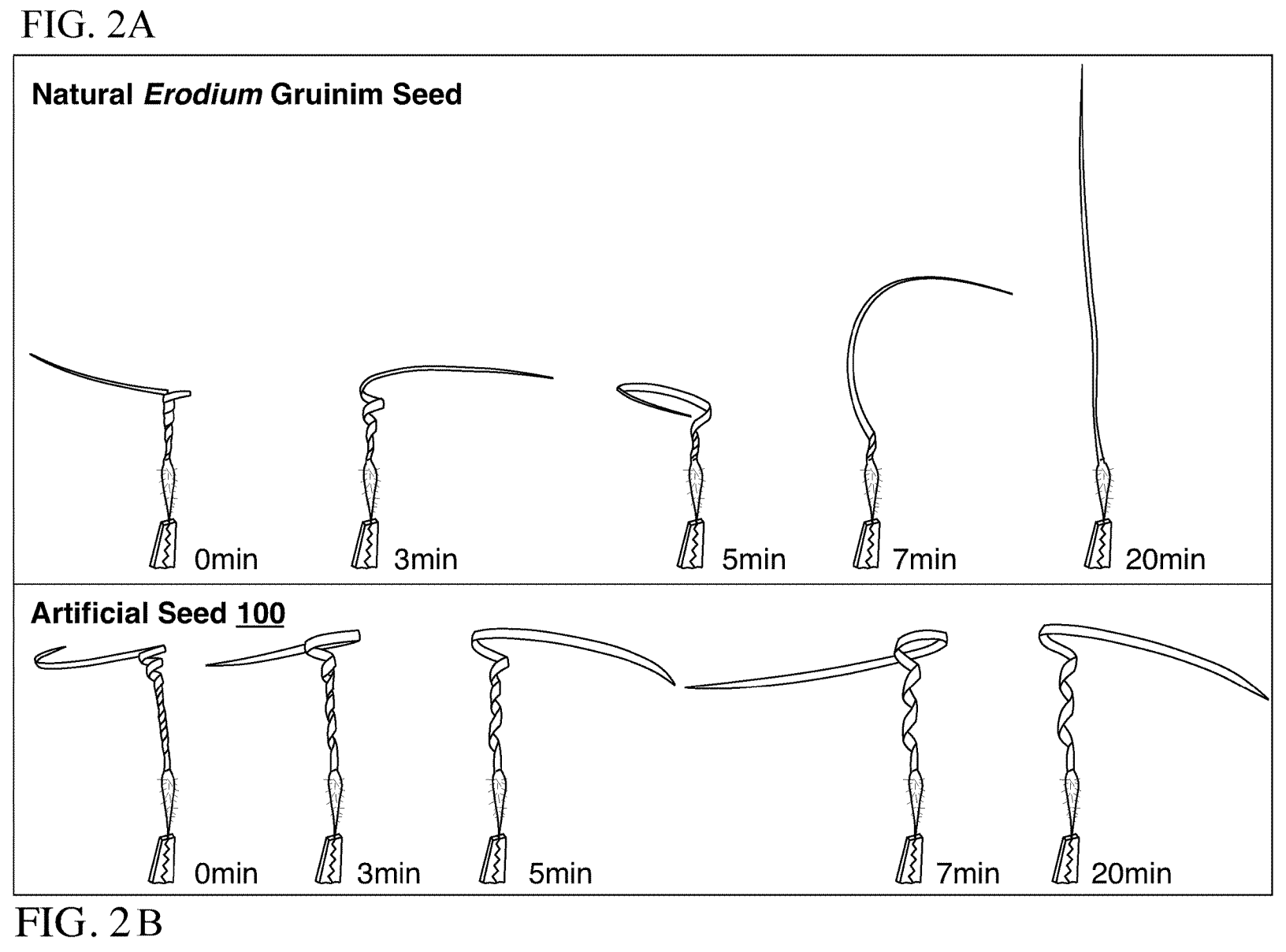

Morphing Behavior of the Seed Devices: Both the various embodiments of seed devices 100 of the present invention and the *Erodium* seed can coil and uncoil their bodies 120 reversibly in reaction to relative humidity change in the environment, as shown in FIGS. 2, 3, 10C through 10E, 13, 20A and 20B. FIG. 2 shows both seeds undergoing a hydration process immersed in a water tank. FIG. 2A illustrates the hydration process for the *Erodium gruinum* seed (the "*Erodium* seed"). FIG. 2B illustrates the same process for one embodiment of a seed device 100. The scale bar for FIGS. 2A and 2B is 20 mm. Both seeds shown in FIGS. 2A and 2B absorb water and uncoil to the maximum extent in 20 minutes. As disclosed herein, the morphing behaviors of the various embodiments of seed devices 100, in terms of the geometry and reaction time, resemble those of the natural *Erodium* seed. Although some embodiments of the seed device 100 of the present invention does not go as straight as the natural *Erodium* seed when fully hydrated, the total number of revolutions, a critical biodesign parameter, during one hydration-dehydration cycle is comparable and evaluated quantitatively later (see FIG. 13). Most embodiments of seed devices 100 according to the present invention uncoil in response to an increase in or a higher level of humidity in the environment around the seed device 100 and coil in response to a decrease in or a lower level of humidity in the environment surround the seed device 100.

Figures 3A, 3B, 3C:
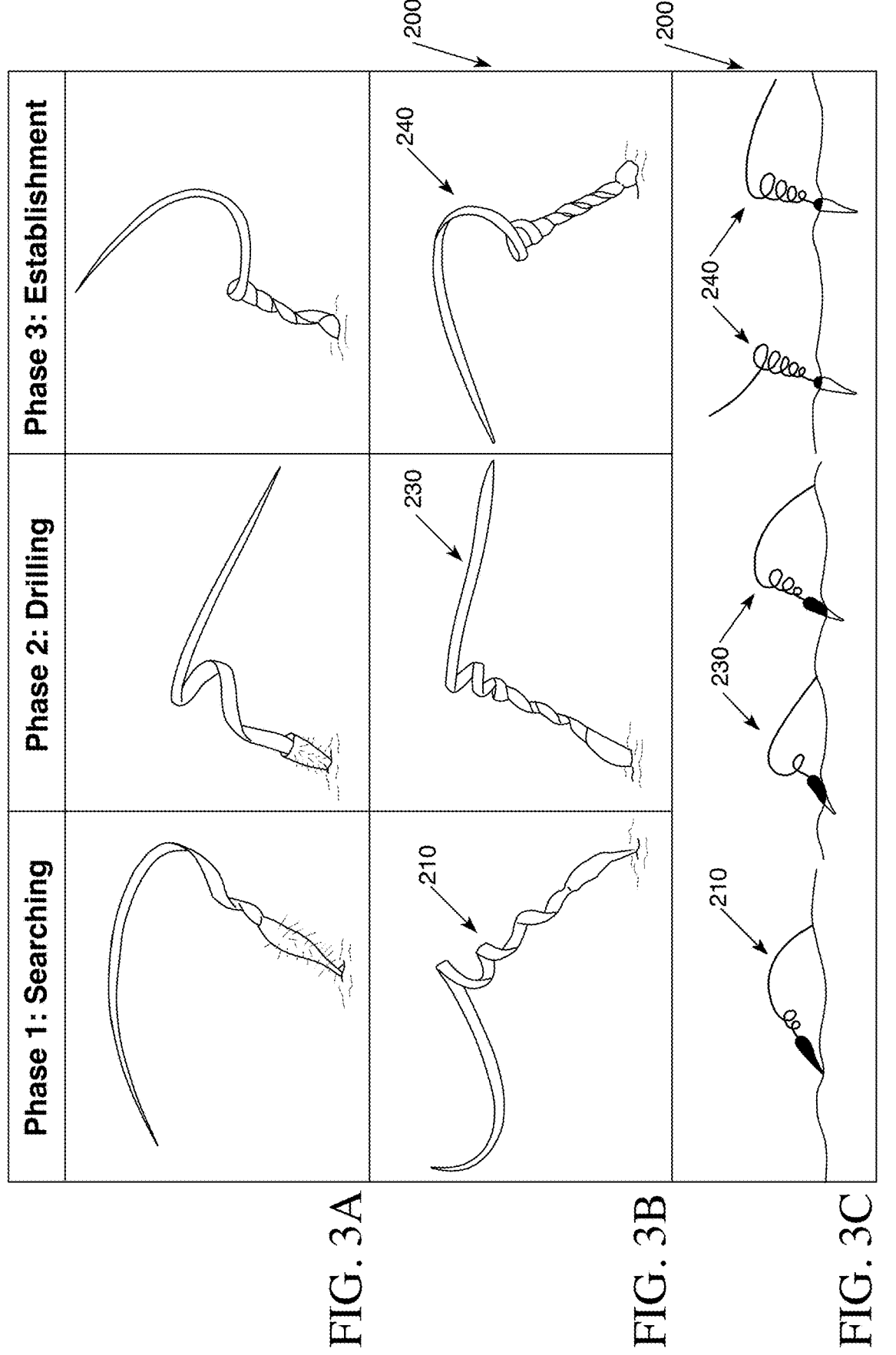
FIGS. 3A through 3C illustrate the drilling processes of the *Erodium* seed and of one embodiment of a seed device according to the present invention.

Drilling Function of the Seed Devices: In response to rainfalls or relative humidity changes in the environment, the seed devices 100 can drill into the ground by coiling and uncoiling their bodies 120. One embodiment of a drilling process 200 for a biomimetic seed device 100 of the present invention is shown in FIGS. 3A through 3C. FIG. 3A illustrates the drilling process for a natural *Erodium* seed. FIG. 3B illustrates one embodiment of the drilling process 200 for one embodiment of a seed device 100 of the present invention. FIG. 3C illustrates three of the steps of the drilling process 200 of one embodiment of the present invention: (a) searching for crevices in the soil 210, anchoring and drilling phase 230, and the establishment phase 240. For a more detailed list of steps in the drilling process 200, first the seed device 100 enters a searching phase 210, wherein the helical body 120 of the seed device 100 uncoils and coils repeatedly to search for a crevice. Second, the seed device 100 finds a crevice 220 in which it can situate its tip 110. During this crevice finding phase 220, the seed device 100 repeats coiling-uncoiling cycles as the relative humidity changes in the environment. The third phase, the drilling and anchoring phase 230, comprises the successful anchoring of the tip 110, which indicates the onset of the drilling phase 230. Lastly, the seed device 100 reaches its establishment phase 240 as it keeps drilling deeper.

While the *Erodium* seed drilling behavior has been previously well observed and modeled in mechanics, physics and biology, the embodiments of the seed device 100 and the drilling process 200 provide the first biomimetic system that is successfully engineered for HCI uses.

The seed devices 100 of the present invention can be designed for use with a wide variety of substrates including dirt, rocks, clay, sand, soil, decomposed or decomposing organic matter, certain wetlands or marsh-type lands and any combination of these.

Hci Implication of the Seed Device and Processes

Various embodiments of seed devices 100, processes and methods of the present invention can be utilized in the context of agriculture and environmental conservation, especially for the tasks such as natural seeding, sensing, monitoring, and creating interactive experiences. Additionally, seed devices 100 can assist various implementations of the Internet of Things ("IoT") and ubiquitous computing in the field (see FIG. 4).

Sensing. There are a number of sensing capabilities, analog or digital, that can be carried by embodiments of the seed devices 100, such as Hall effect sensing, moisture sensing, chemical sensing, and range sensing. The seed devices 100 can constitute interfaces that sense both environmental factors in or above the soil and human or animal activities, such as invasion, in farmlands. Additional use cases of seed devices 100 of certain embodiments of the present invention include interactive gardens where a seed device 100 can be scanned and provide augmented digital information on mobile devices. Examples of sensors associated with certain embodiments of seed device 100 are shown in FIGS. 1, 4, 15, and 16. These sensors, such as sensor 410 shown in FIGS. 1B and 4, can include a power source and processor to assist in collecting and processing environmental data and information around seed device 100. This collected data can be processed for communication to an observer through a display attached to see device 100. The collected data also can be communicated through a transmitter to an external display or network. As explained herein, some embodiments of a device according to the present invention can have a payload that comprises a wireless transmitter for transmitting collected information to one or more of the following: (a) an external display, (b) an external data collection repository, (c) an external network; and/or (d) one or more other seed devices.

Figure 4:
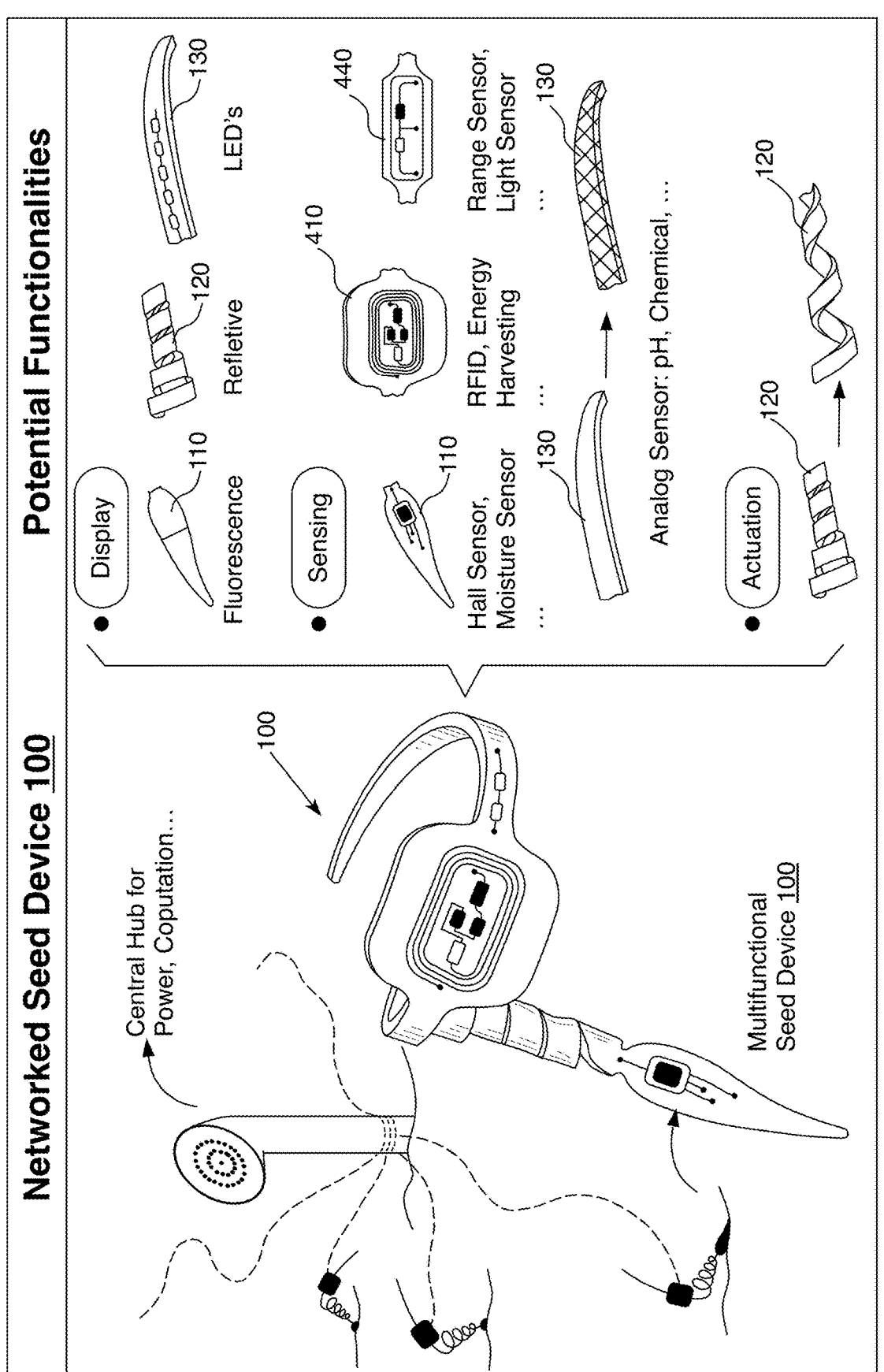
FIG. 4 illustrates a variety of embodiments of a self-drilling interface enabled by the seed device platform of the present invention.
Figures 14A, 14B, 14C:
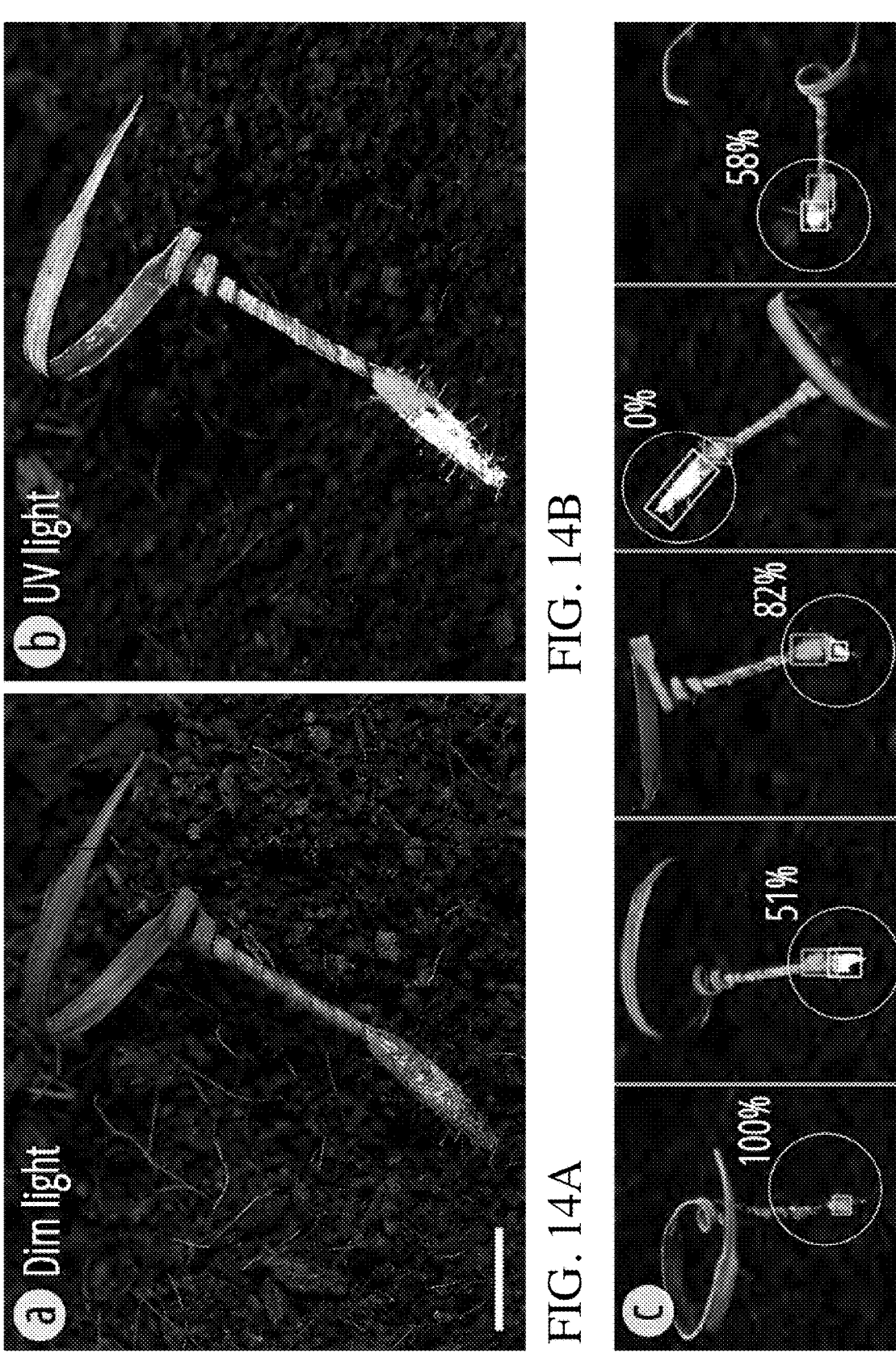
FIGS. 14A through 14C show fluorescent seed devices for vision-based remote monitoring.
Figures 15A, 15B, 15C:
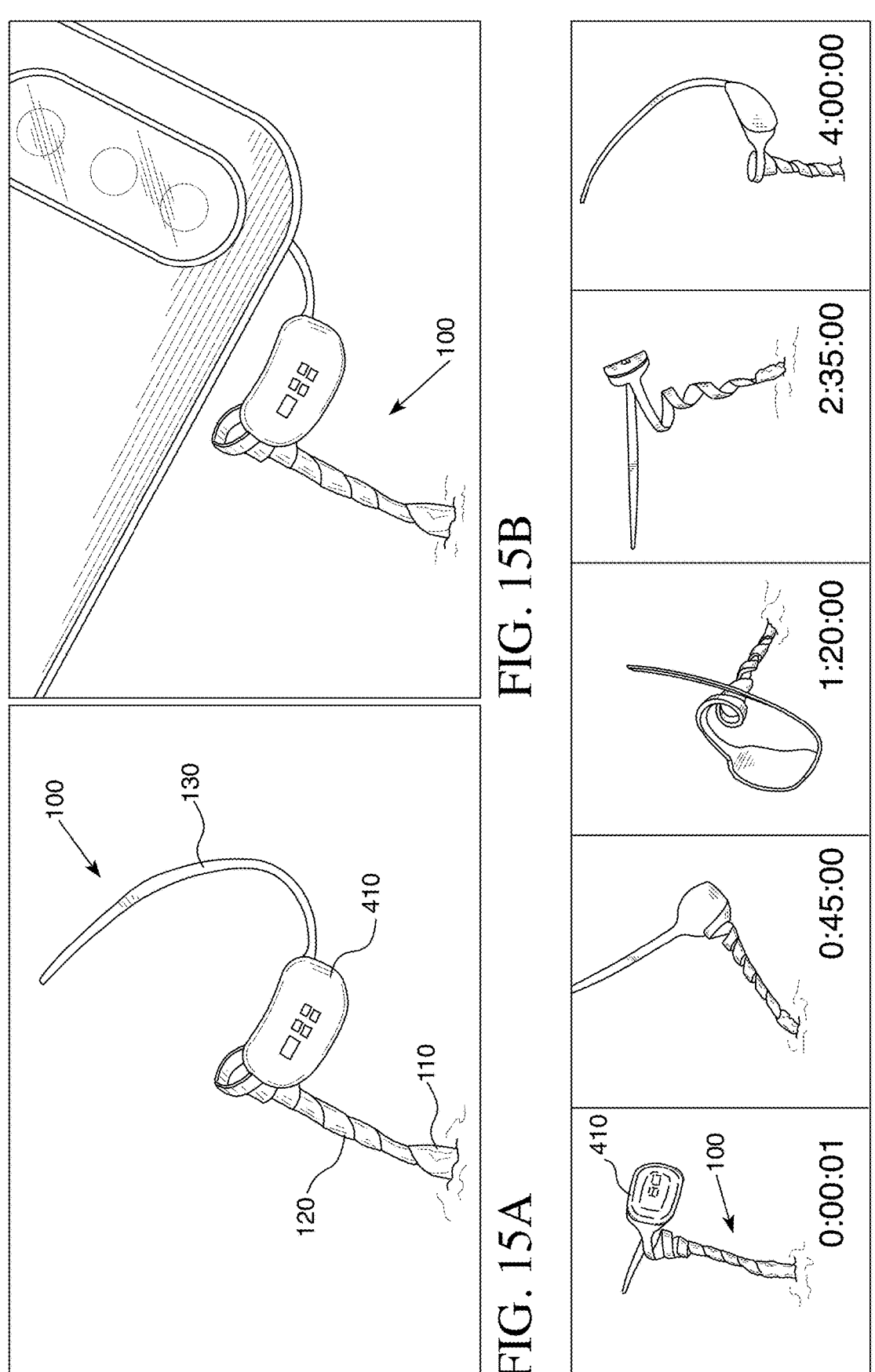
FIGS. 15A through 15C illustrate three applications of the seed device technology of the present invention.

Display. In addition to its organic form, and as discussed above, some embodiments of seed devices 100 according to the present invention incorporate digital and/or analog displays located on the seed devices 100. These displays can be electronic displays of information collected by sensors 410 or the displays can be static marker or indicators, examples of which are shown in FIG. 4. For example, light-emitting diodes ("LEDs") can light up by induction coils and respond to nearby signals (see FIGS. 4 and 15). Color-coded seed devices 100 of one embodiment of the present invention, with or without embedded electronics, act as location tags for easy spotting and recycling (see FIG. 14). Entire seed devices 100 or parts of a seed device 100 can be designed with markers and/or indicators to be fluorescence or reflective to enable them to be located. Powered by computer vision, these seed devices 100 can also be spotted from satellite or aerial images to help track deployed devices. FIG. 15A illustrates one embodiment of a seed device 100 according to an embodiment of the present invention carrying a RFID tag 410 to establish itself in the soil. FIG. 15B illustrates one embodiment of a seed device 100 of an embodiment of the present invention responding to a cell phone NFC reader 420 to light up an LED. FIG. 15C illustrates a RFID attached seed device 100 of one embodiment of the present invention established in four cycles.

Actuation. The coiling and uncoiling of the various embodiments of seed devices 100 of the present invention are enabled through the application of the design and engineering principle of natural hygromorphic materials. This allows the functional seed devices 100 to self-actuate and self-drill into the soil. Instead of utilizing electricity as the trigger, which raises challenges in energy consumption and e-waste management, the source of power for most embodiments of the seed devices 100 of the present invention comes from environmental stimulus—moisture fluctuation.

Figures 16A, 16B, 16C, 16D:
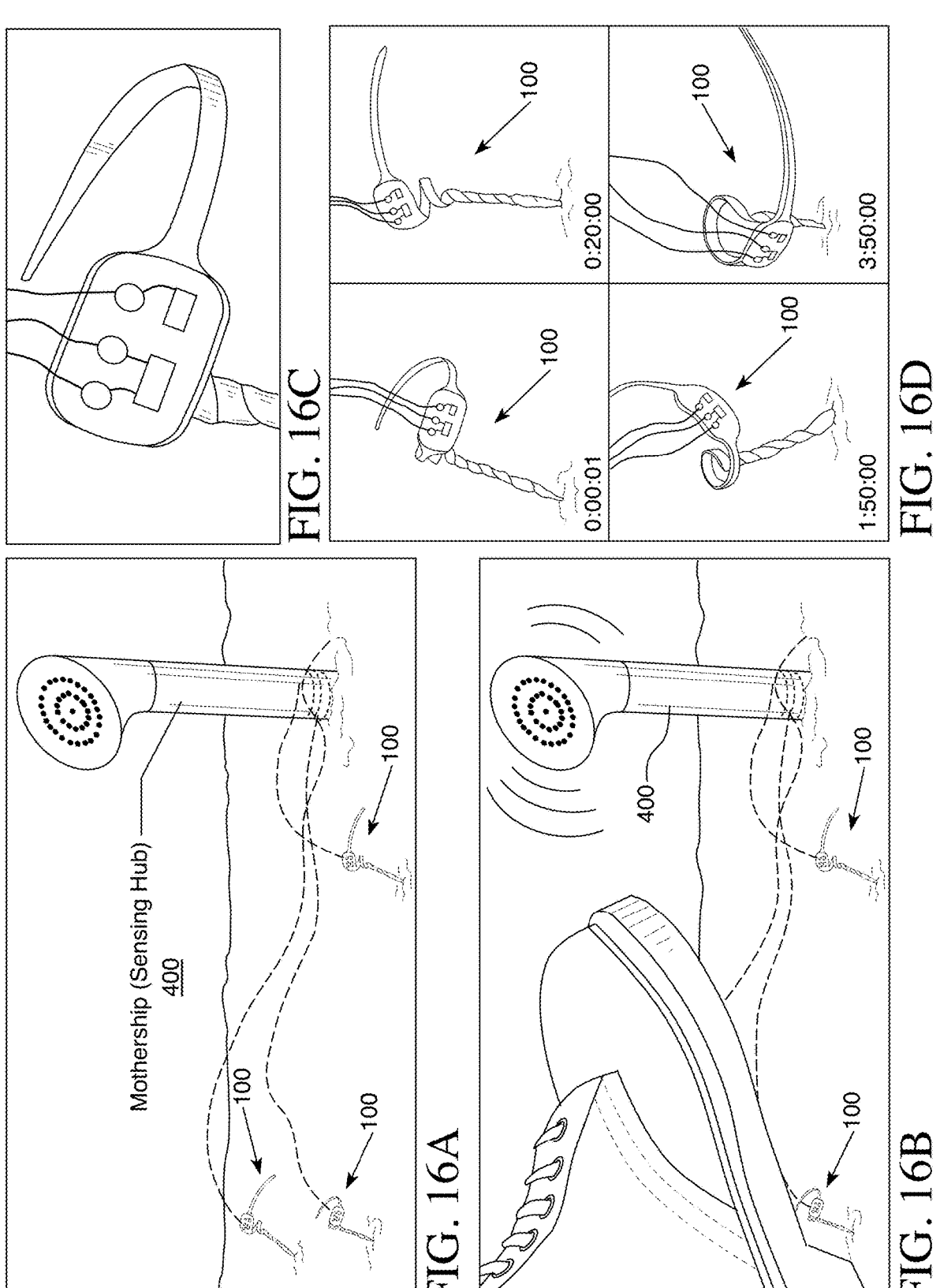
FIGS. 16A through 16D illustrate one embodiment of a networked seed device according to the present invention.

Networked Seed Devices. Similar to the structure of vascular plant roots, the various embodiments of seed device systems of the present invention combine individual seed devices 100 into a synergistic network, with each seed device 100 connected to a central hub 400. Since each seed device 100 has to be relatively lightweight and agile for a good drilling performance, this configuration allows for more interactive and functional use cases by offloading some bulky computing and power modules to the stationary hub 400 while keeping the seed device 100 lightweight. For example, as illustrated in FIG. 16, a microcontroller and a speaker are embedded in the central hub 400 of one embodiment of a seed device 100 to communicate and respond to the distributed seed devices 100. FIG. 16A illustrates networked seed devices 100 according to one embodiment of the present invention connected to a mothership or central hub 400. FIG. 16B illustrates how seed devices 100 according to one embodiment of the present invention sense invaders and trigger the central hub 400 to emit light and sound to alarm. FIG. 16C shows how a wired seed device 100 according to one embodiment of the present invention is established in four cycles. The scale in FIG. 16 is 10 mm.

Biodesign Principles of Seed Devices

Figure 5:
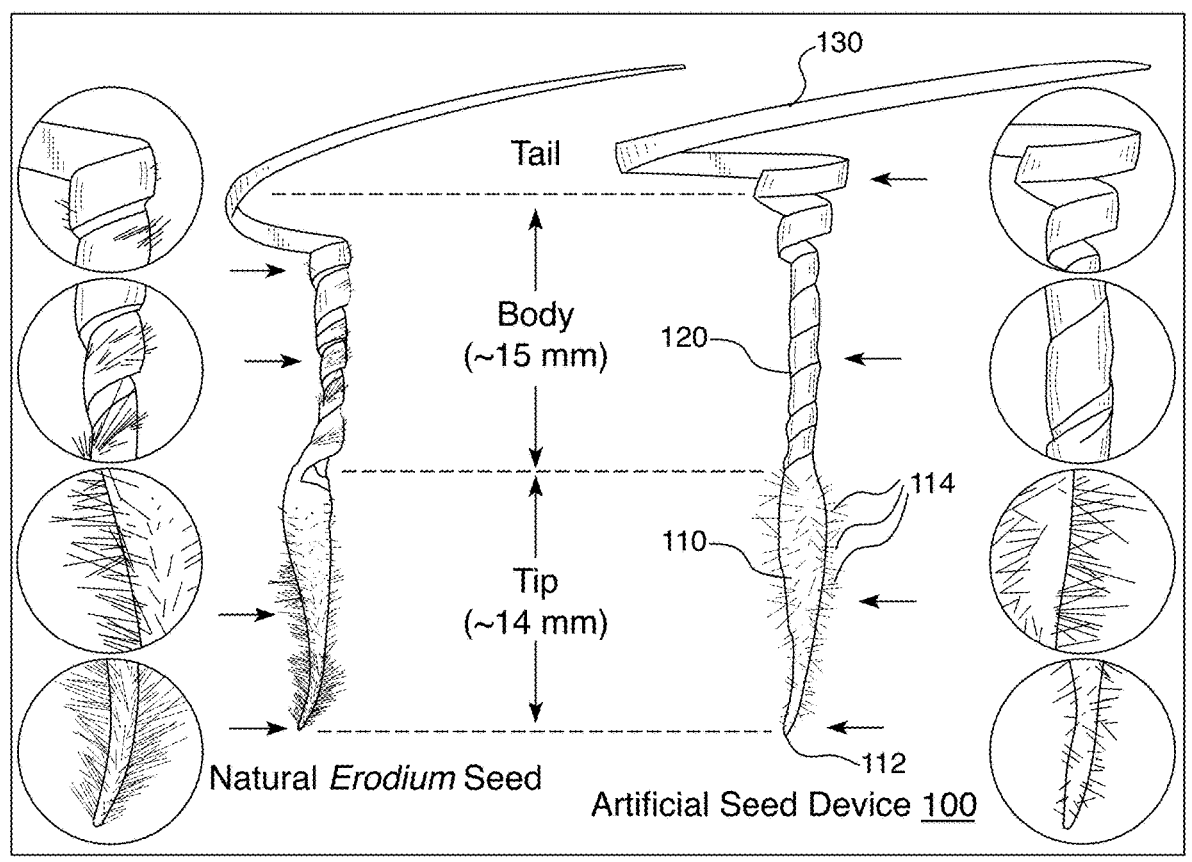
FIG. 5 shows an anatomical comparison of one embodiment of a seed device of the present invention compared to an *Erodium* seed.

The structure and design of most of the embodiments of seed devices 100 of the present invention mimic the basic components of an *Erodium* seed. FIG. 5 illustrates a comparison between the anatomy of one embodiment of a seed device 100 (right side of FIG. 5) and a natural *Erodium* seed (left side of FIG. 5). Both seeds are comprised of three basic parts: (1) a tail 130, (2) a body 120, and (3) a tip 110.

Nature precisely optimized the *Erodium* seed through evolution over millennia. Rich literature studying *Erodium* seeds demonstrates how, from cellular construct to macroscopic shape and body hairs, almost every biodesign element of the seed has a functional purpose. The devices and methods of certain embodiments of the present invention focus on replicating the essential components from the *Erodium* seed (coiled body, curved tail, and pointy tip) and modifying the system based on a novel fabrication method 300 (using number of revolutions and scaling).

Stiff and Coiled Body. The body 120 of most embodiments of seed devices 100 of the present invention has two ends, one end that connects to a tip 110 and the other, opposite end that connects to the at least one tail 130. The stiffness and the geometry of the coiled body 120 are two critical factors. In terms of mechanics, the body 120 can be simplified as a spring model. The thrust force a spring generates while drilling depends on the stiffness of the spring, which is affected by its cross-sectional geometry and the tightness of the coil. With this high stiffness requirement, most moisture responsive soft materials including various natural and artificial hydrogels are not capable.

Figures 9A, 9B, 9C:
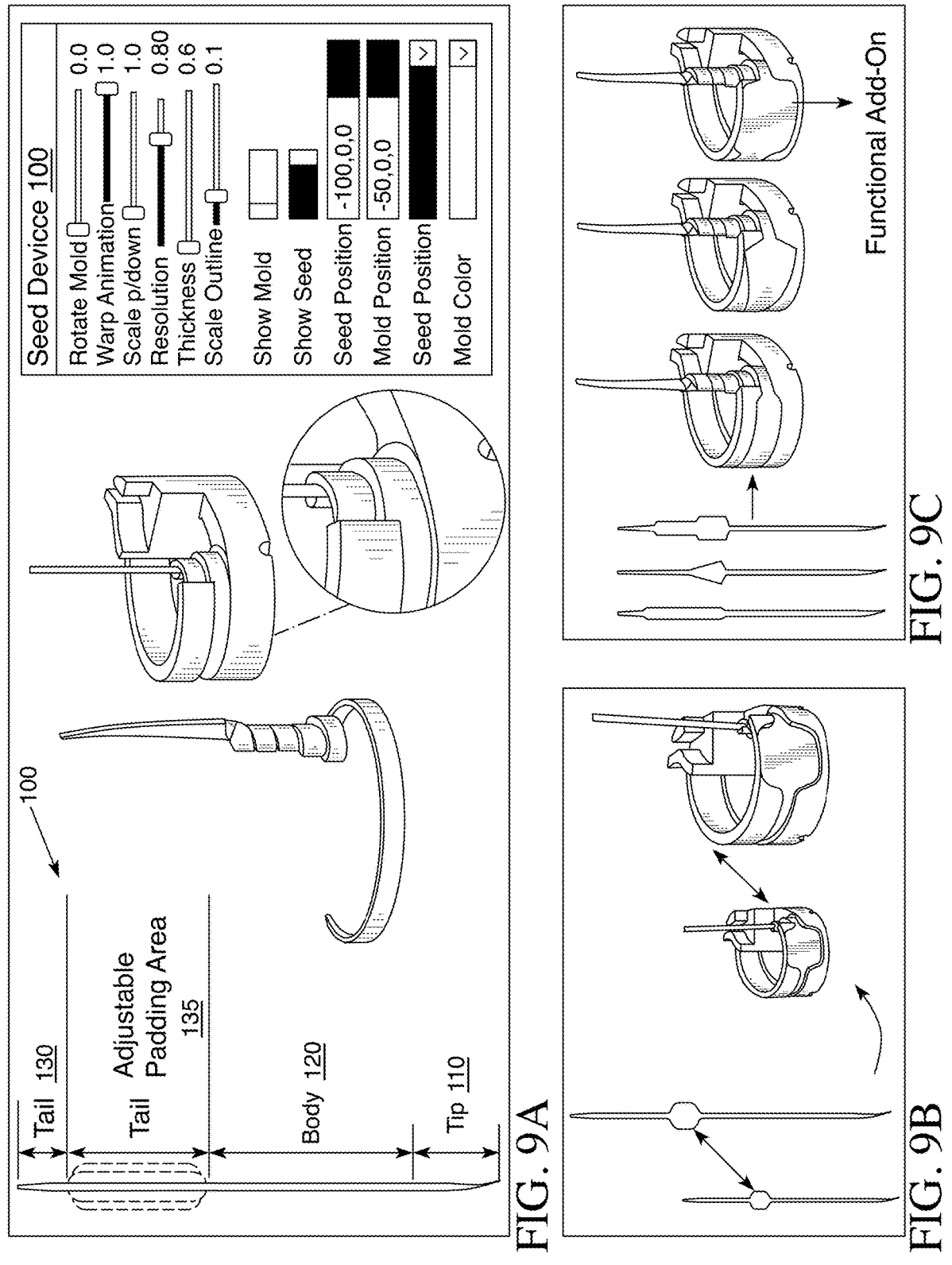
FIGS. 9A through 9C illustrate one embodiment of a design tool according to the present invention.

Curved Tail. The extended and curved tail 130 of one embodiment of the present invention provides support to initiate drilling. The specific curvature of the tail 130 (with bending radius ranging from 12 mm to 16 mm for a preferred embodiment) is also critical. Before the tip 110 can establish itself in the soil, the tail 130 has to anchor itself in the soil and create a stable support (see FIG. 3, Phase 2: drilling). One embodiment of a mold 500 of the present invention (shown in FIGS. 9A through 9C) is designed to ensure a consistent shape for the tail 130.

Pointed, Rigid/Stiff, and Hairy Tip. The tip 110 of a preferred embodiment of the present invention is shaped like a point 112 (also referred to as a pointed tip 112) to help anchor the seed device 100 into a crevice 430 and initiate drilling. More importantly, in certain preferred embodiments of the present invention, directional hairs 114 prevent the tip 110 from slipping out and ensure the tip 100 continues to drill downward between cycles. While hairs 114 in slanted arrangement can better assist unidirectional movement, hairs 114 normal to the surface, which is achievable by electrostatic surface flocking further detailed herein, are effective in providing just enough friction against backward motion. Hairs 114 in all and/or a variety of directions are included within the scope of the present invention. Some embodiments of seed devices 100 can be designed without hairs 114; however, a lack of hairs 114 will result in more cycles needed for establishment.

Proportion. The proportion between the length of the tail 130, body 120, and tip 110 is critical as it decides the minimum effective angle (θ) 140 at which the seed device 100 can drill (as shown in FIGS. 6A through 6D). In certain preferred embodiments of devices and methods of the present invention, even when the seed devices 100 are engineered to be different sizes, they have the same minimum effective angle 140, which can be fixed by scaling body length, tail length, and body projection (L) in proportion. In one preferred embodiment of a fabrication method 300 of the present invention, all the engineering measurements, including the thickness (T), width, and diameter of the coil, are scaled proportionally. Effective drilling happens when the tip 110 is inclined at a minimum angle of 30° to 40°, and the consistent proportion is critical to ensure the minimum angle 140 can be reached as the end of the tail 130 touches the ground. However, any angle between about 0° and 90° measured from the ground or substrate better enables the seed device 100 to drill into the ground. Ninety-degree is the most effective. However, for most embodiments of the seed devices 100 the tail 130 will prop up the tip 110 to an angle between 0° and 90° measured from the ground or substrate. One embodiment of a seed device 100 according to the present invention has an angle of at least about 30°.

Figures 10A, 10B:
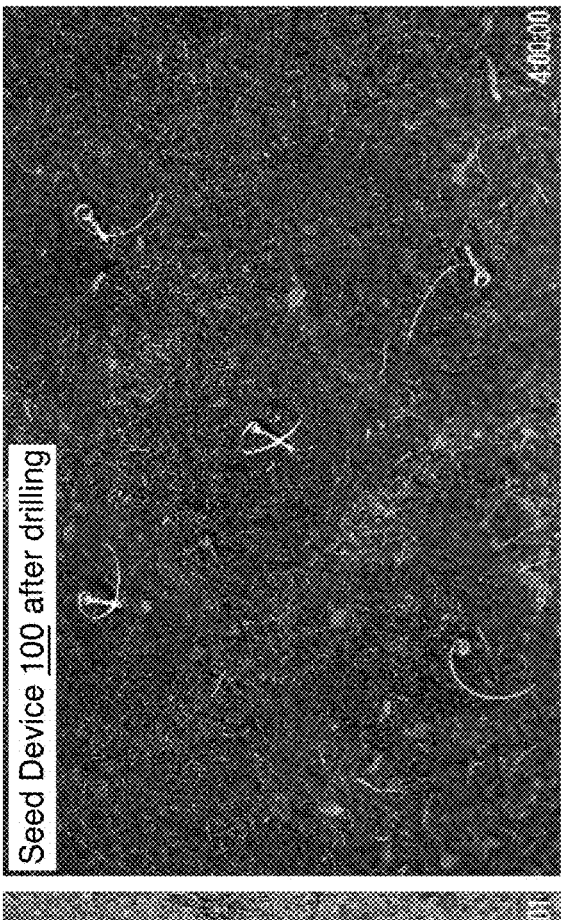
FIGS. 10A through 10E show the drilling results of various seed devices according to the present invention.
Figure 10C:
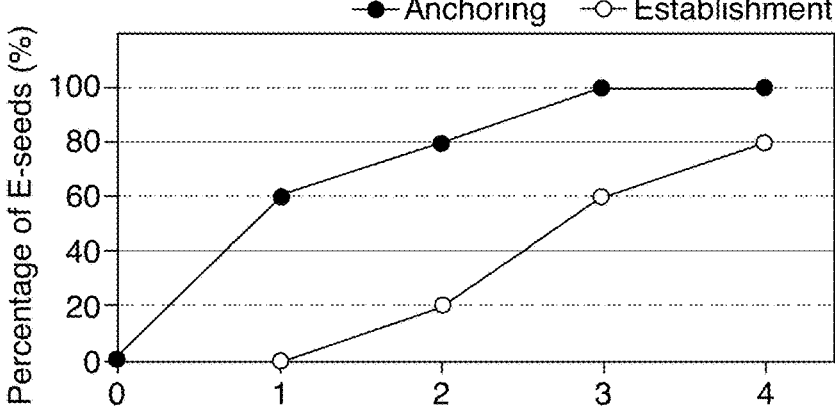
Figure 10D:
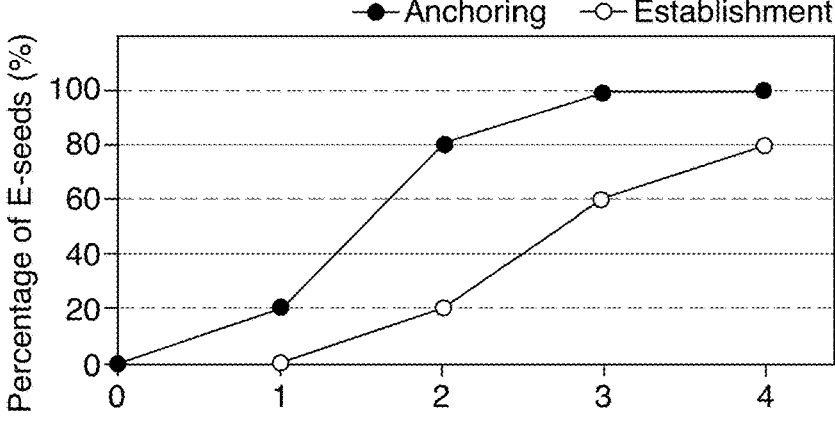
Figure 10E:
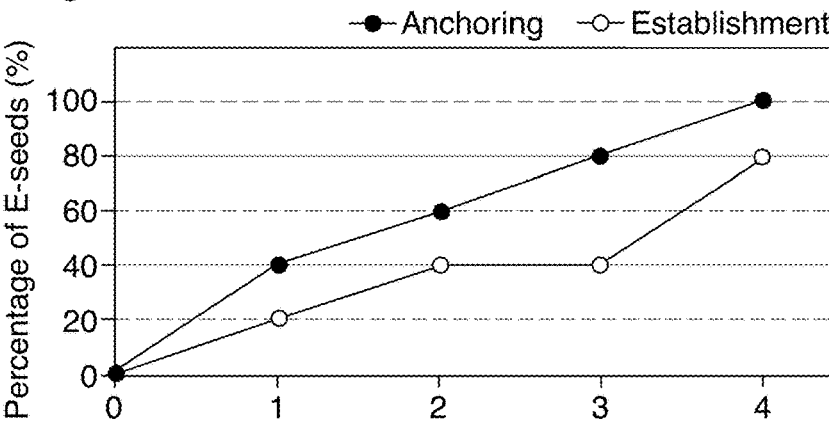

Total Number of Revolutions. The total number of revolutions generated during a coiling and uncoiling cycle is very critical as it partially determines how far the seed devices 100 of the present invention can drill during one cycle. The body of an *Erodium* seed has 5 coils, all of which will fully unravel during hydration, hence generating 5 revolutions. One embodiment of the seed device 100 of the present invention has 7 coils, which generate 4 revolutions as a result of one embodiment of the fabrication process 300 of the present invention. As will be discussed, matching the proportion over the number of revolutions is preferred and does not compromise the drilling efficacy (as shown in FIGS. 10A through 10E). FIGS. 10A and 10B shows the drilling test results of seed devices 100 of the present invention before and after, respectively, four hydration-dehydration cycles. All of the seed devices 100 shown in FIG. 10B successfully established after the four cycles. FIGS. 10C through 10E illustrate the drilling rate of some embodiments of small, medium and large seed devices 100 of the present invention.

Fabrication of Seed Device—Overview

Five-Step Method to Create a Seed Device. One embodiment of a fabrication method 300 for producing seed devices 100 according to the present invention is illustrated in FIGS. 18A through 18D and in FIG. 23A. This fabrication method 300 results in the production of engineered, high-performance, wood-based hygromorphic actuators (seed devices 100) that mimic the self-drilling functionality of natural seeds with improved design considerations. The various embodiments of seed devices 100 can adopt a variety of designs that make them superior to natural *Erodium* seeds in ways such as shortening the period of struggling to initiate drilling, increasing the thrust force against the friction provided by harder soils, and carrying customized payloads of different sizes and contents.

Figure 18A:
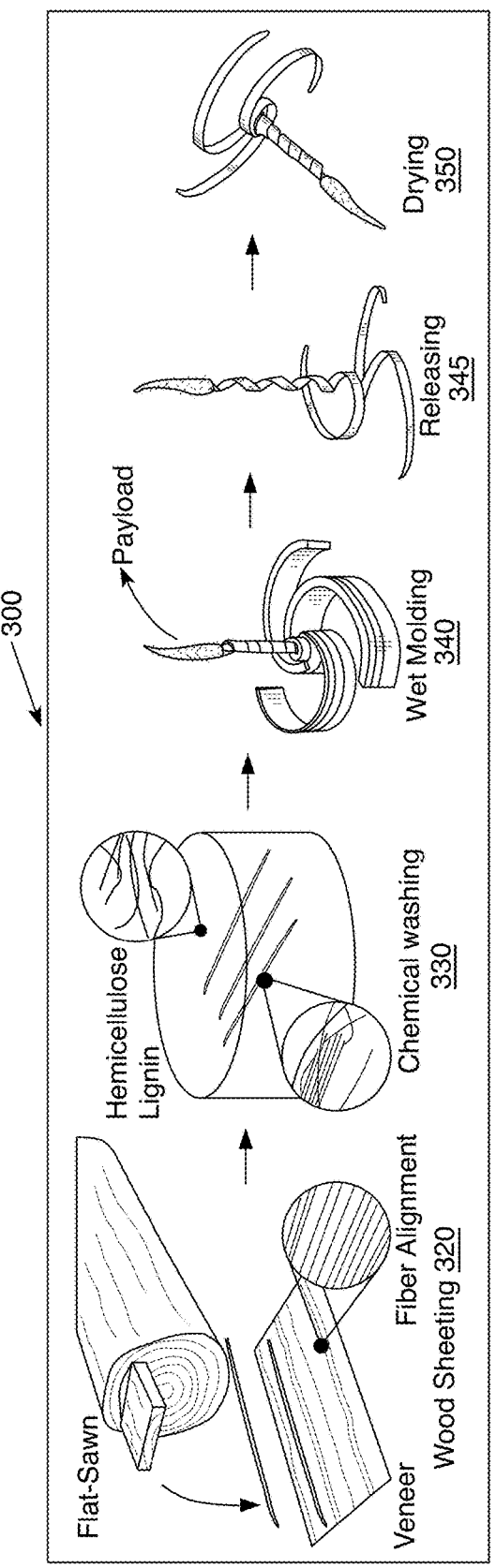

The engineering of the hygromorphic actuation is achieved by a five-step fabrication method 300, one embodiment of which is illustrated in FIG. 18A. This embodiment of a fabrication method 300 includes the steps of wood sheeting 320, chemical washing 330, molding 340, releasing 345, and drying 350, which could be in the form of baking 350. Chemical washing 330 of the wood veneer is critically important to this embodiment to increase its moldability for a large initial curvature and thus actuation amplitude. Chemical washing 330 to partially remove lignin is known to engineering high-performance structural materials. However, most of the work in that area focuses on wood densification and increased mechanical strength. Those researched samples are almost fully water resistant and none of them aimed at exploring the shape-changing property of wood with chemically altered microstructure, as is accomplished by the present invention.

Figure 18B:
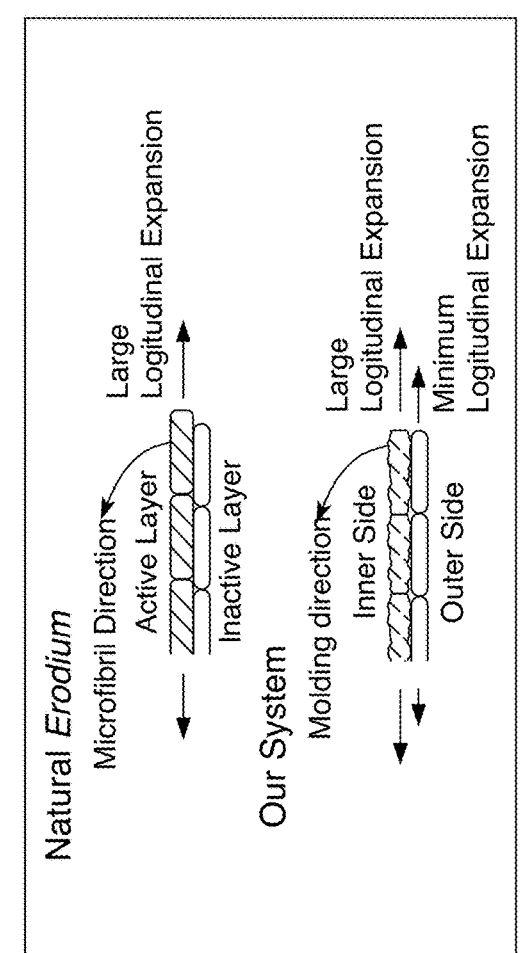

FIGS. 18A through 18D illustrate one embodiment of a biomimetic design of a seed device 100. FIG. 18A shows the five-step fabrication method 300 described above. This embodiment of the fabrication method 300 creates wood-based hygromorphic actuators with large initial bending curvatures. FIG. 18B shows an *Erodium* seed awn inspired morphing mechanism, which has slanted helical fiber arrangement that induce anisotropic swelling at an angle to the central axis of the awn. Various embodiments of the present invention, also explained in FIG. 18B, result in the inner side of the coil having a larger longitudinal swelling ratio than the outer side, introduced by non-uniform mechanical strain, when absorbing ambient moisture. FIG. 18C illustrates how the design concept of the artificial payload carrier can have customized awn (e.g., numbers of tails 130 and varied coils for the body 120) and tailored payloads (e.g., seeds, microorganisms, biodegradable sensors).

To increase drilling efficiency, it is important to increase the initial resting angle, α (shown in FIG. 18C). To do so, one embodiment of a tri-tail version of the seed device 100 was designed (shown in FIG. 18C). Inspired by *Erodium* seeds, one overarching goal of the present invention technology is to design a universal payload carrier that can potentially carry a variety of vegetative seeds, sensors, and other microorganisms to benefit, e.g., vegetable plantation, reforestation, sustaining ecosystems, and soil monitoring (shown in FIG. 18D).

Fabrication of Seed Device—Detailed Discussion

Figure 23B:
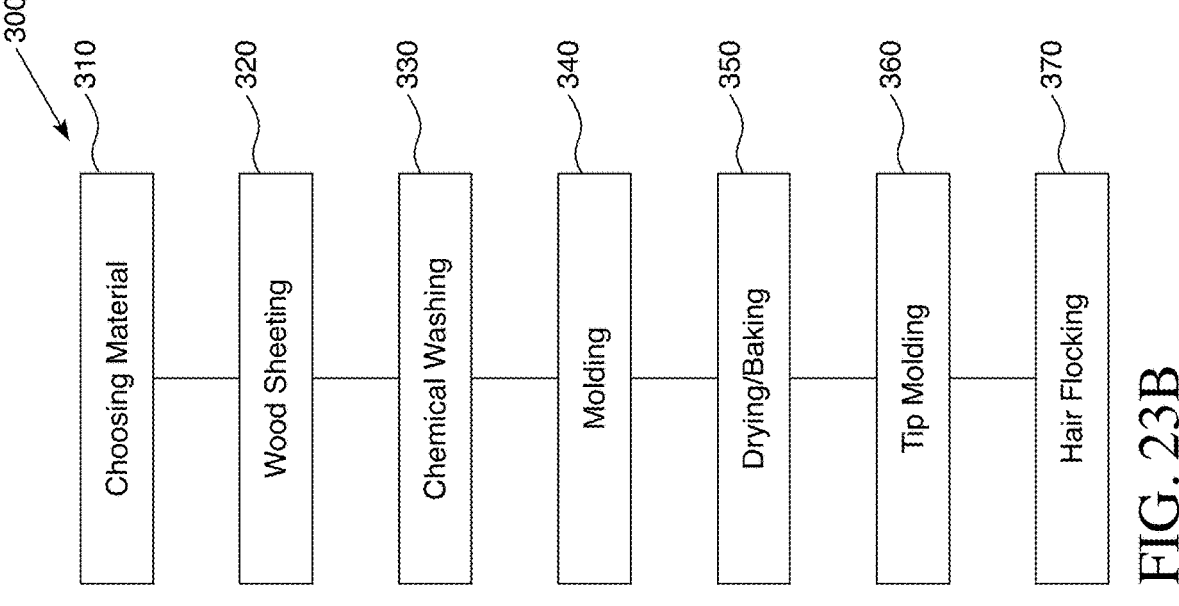
FIGS. 23A and 23B are flowcharts of two embodiments of a drilling process according to the present invention.
Figure 23A:
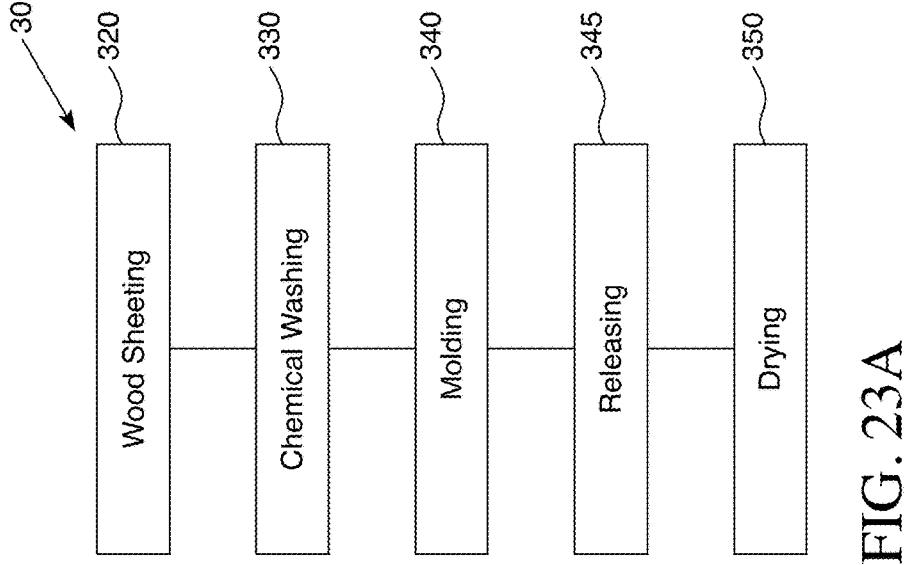

Body and Tail. The first step in one embodiment of a fabrication method 300 as illustrated in FIG. 23B is choosing the material 310 for the body 120 and tail 130. The preferred embodiments of seed devices 100 are comprised of wood veneer as a moisture-responsive morphing material, which is not conventionally considered as compliant, to fabricate the body of seed devices 100. The use of caustic soda to soften the wood veneer enabled this material to be used. Certain embodiments of the present invention encompass the use of any chemicals to wash and soften the wood that are appropriate for the wood type that is being used.

While many different wood veneers can be used for the body 120 and tail 130, hardwood veneer works well because it is mainly composed of cellulose, just like *Erodium* seeds. Other advantages to making the body 120 and tail 130 out of wood is that wood is biodegradable, hygromorphic, abundant, and moderately strong. Choosing the material 310 for the body 120 and tail 130 will depend upon many factors including but not limited to the intended purpose of the seed device 100, the environment in which the seed device 100 is intended for use, and whether or not the seed device 100 is intended to biodegrade or be collected after distribution. The body 120 and the tail 130 grow as one continuous structure with a gradient in the cell alignment, which results in a gradually changing curvature. In certain preferred embodiments of seed devices 100, the two parts are distinguished carefully by designing the curvature change to match that of the real seed.

When evaluating the strength of a spring (i.e. the coiled body of a seed device 100), the elastic modulus determines the strength of that spring against external forces. The bending modulus, on the other hand, determines the resilience of a piece of material against deflection. These two properties combine to make the body 120 and the tail 130 of the seed devices in certain embodiments of the present invention. Additionally, since the uniformly bundled fibers of wood veneer are transformed into a coil and the hygroscopic power is harvested to actuate the seed devices 100, the alignment and tangential shrinkage of the wood is important. Based on these criteria, the examples listed in table shown in FIG. 17 include two types of hardwood, white oak and hard maple, which are superior to most soft wood in bending modulus and elastic modulus with satisfactory tangential shrinkage. Although the hard maple has slightly better mechanical properties, its wavy grain results in poor alignment. Bamboo outperforms in all of these parameters, with no growth ring inherent to trees. However, the growing speed of bamboo has rendered it prone to disintegration during harsh chemical washing, the step following the wood veneer preparation. Considering all of these factors, white oak preferred type of wood for seed devices 100 of the present invention, but this invention encompasses all types of wood that survive the fabrication process and have the properties and/or performance ability discussed herein.

Wood Sheeting 320. The next step is to sheet the wood 320 to the thickness (T see FIGS. 6A through 6D) proportional to the body length, calculated from an *Erodium* seed body. The preparation of wood and the sheeting of veneer 320 follow the standard woodshop procedure. As an example, one type of wood purchased for one embodiment of the fabrication method 300 was sectioned into 40 cm by 20 cm blocks and roughly sawn into thinner sheets. Each sheet is carefully sanded flat in a drum sander until it reaches the proportional thickness ranging from 0.4 mm to 0.8 mm.

Washing 330. The aim of the washing step 330 is to achieve high moldability of the wood veneer without sacrificing mechanical integrity. To that end, the softening effect of caustic soda on wood achieves these two goals. Prior to the washing step 330, an outline of one embodiment of a seed device 100 is cut from wood veneer (as shown in FIG. 7A). One method to achieve this is laser cutting the wood veneer. Next, to wash 330 the veneer the strips of wood veneer are immersed in an aqueous solution to encourage high moldability without sacrificing mechanical integrity. One method to accomplish this according to one embodiment of the present invention is the use of 10 g food grade caustic soda in 100 mL of water at 80° C. for 7 hours, followed by washing in hot water with gentle agitation three times. The present invention, in various embodiments, encompasses a wide variety of chemicals and processes for washing 330 the wood, which will be dictated by the type of wood used, the intended purpose for the seed device 100, the environment in which the seed device 100 will be used, and the payload for the seed device 100, among other factors.

Molding 340 and Baking 350. The molding 340 step includes a variety of molding techniques including: (1) wet molding; (2) wet molding, wet-release, dry; (3) wet molding, keep on or in the mold until dry, then release. For some embodiments, the washed wood veneer samples are pat-dried and left in open air for 10 minutes before molding. For the molding step 340, each sample is wrapped around a mold (such as a 3D-printed mold) along the groove with the matching width and padding size. After fastening the sample with a clamp (shown in FIG. 7B), the whole mold is baked at 60° C. for 6 hours so the sample is completely dry (FIG. 7C) (the baking step 350). The scale bar for FIGS. 7A through 7C is 10 mm. The present invention, in various embodiments, encompasses a wide variety of processes for molding 340 and baking 350 the wood, which will be dictated by the type of wood used, the intended purpose for the seed device 100, the environment in which the seed device 100 will be used, and the payload for the seed device 100, among other factors.

Tip Molding 360 and Hair Flocking 370. The three important criteria in choosing the material for the tip 110 are biodegradability, malleability, and stiffness for drilling. Flour-based dough is one material that can be used because it is biodegradable and moldable, and when the flour dough is properly dried it stiffens to penetrate the soil. In environments where the seed device 100 is in prolonged exposure to moisture, an extra step to waterproof the tip 110 with an ethyl cellulose coating (or another waterproofing compound) is added. Ethyl cellulose is known for its insolubility in water as a biopolymer for environmentally friendly applications, such as the slow release of fertilizer in soil. The present invention, in various embodiments, encompasses a wide variety of materials and processes for tip molding 360 and hair flocking 370, which will be dictated by the intended purpose for the seed device 100, the environment in which the seed device 100 will be used, and the payload for the seed device 100, among other factors.

Figures 8A, 8B, 8C, 8D:
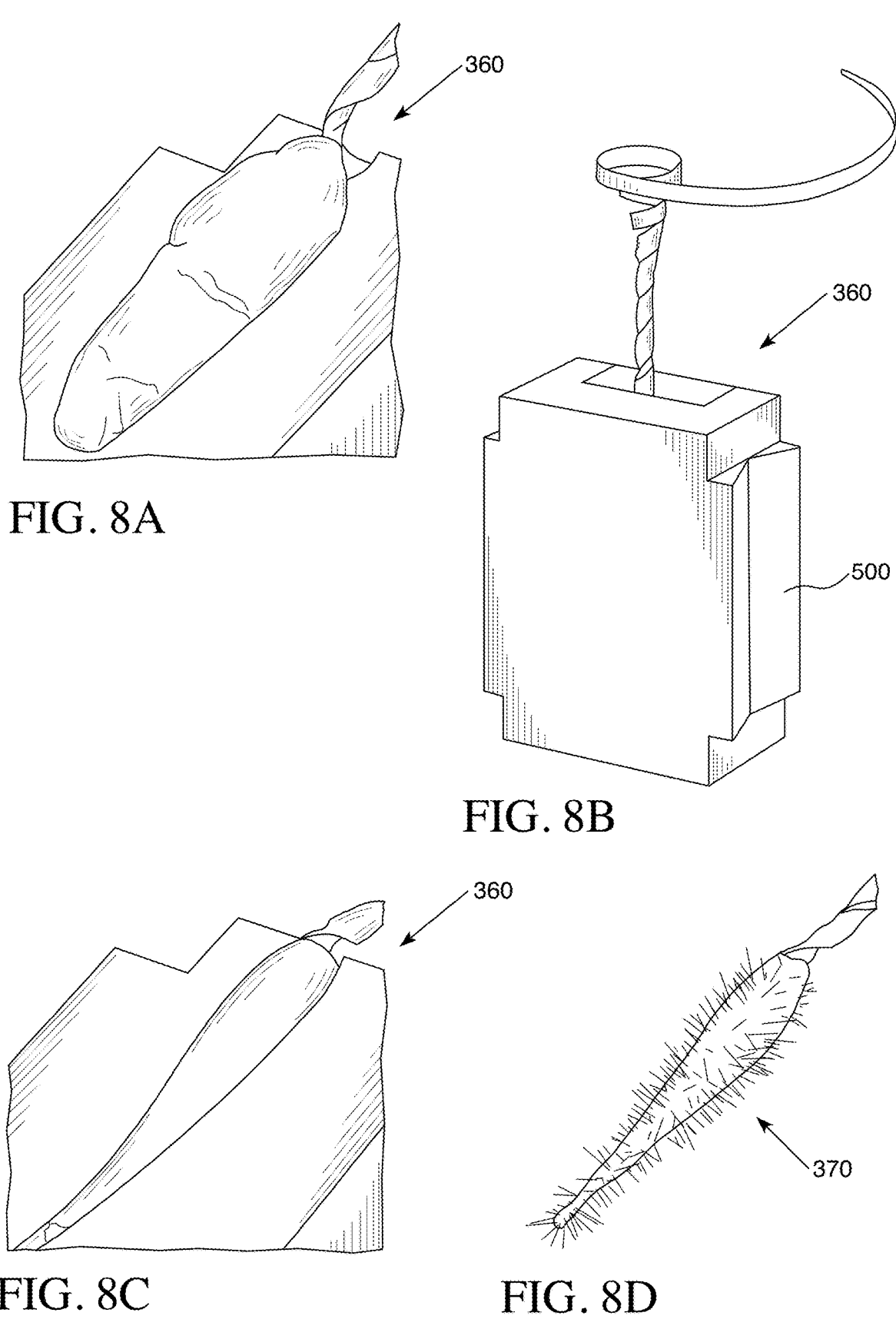
FIGS. 8A through 8D illustrate one embodiment of a fabrication process and associated devices to make the tip of a seed device according to the present invention.

Tip Molding 360. One method 360 to mold the tip 110 of the present invention is to mix 42.5 mL of water and 112 g of flour to make the dough. Knead the dough until the texture is smooth and homogeneous. Cover and rest the dough for 1 hour before molding. A small piece of rested dough is roughly pressed around the tip of the wooden body and sandwiched between the two-part mold (see FIGS. 8A and 8B). The next step in one embodiment of the tip molding 360 is to trim the excess dough that is pushed out of the seams and remove everything from the mold (see FIG. 8C). The next step to this embodiment of tip molding 360 is to leave the tip 110 to dry in open air for 24 hours. Finally, the tip 110 is dip-coated in an ethyl cellulose/ethanol solution (or another waterproofing solution) at least once but preferably twice to waterproof the dough. The concentration of the ethyl cellulose will determine the thickness of the coating. For one embodiment of the present invention 20 weight percent is suitable for the goal of having the tip 110 break down in 24 hours (for example, for the application scenario of seeding and germination.) For a fully waterproof tip 110, tip 110 may need to be dipped more than two times. Again, this depends upon the waterproofing composition being used and the desired length that the tip 110 needs to maintain its structure prior to breaking down. The present invention, in various embodiments, encompasses a wide variety of chemicals and processes for tip molding 360, which will be dictated by the type of tip material used, the intended purpose for the seed device 100, the environment in which the seed device 100 will be used, and the payload for the seed device 100, among other factors.

As explained herein, the tip 110 can carry a wide variety of payloads including but not limited to seeds, microorganisms, fertilizers, soil-enhancers, sensors, etc. For certain payloads, the tips 110 will be configured or shaped to carry the payload during the tip molding 340 step. This can be accomplished by embedding those payloads into the tip 110 during the molding step 340. Other types of payloads can be better connected to the seed device 100 by gluing or adhering the payload to the tip 110 or body 120 after they are formed.

Hair Flocking 370. For some embodiments of the present invention, natural animal hairs to constitute the hairy tip 110 of seed devices 100. The use of natural animal hair will be desirable for certain applications, such as those wherein the seed device 100 is intended to biodegrade. For other applications, a non-natural material can be used for the hairy tip 110. The present invention, in various embodiments, encompasses a wide variety of chemicals and processes for hair flocking 370, which will be dictated by the type of tip material used, the intended purpose for the seed device 100, the environment in which the seed device 100 will be used, and the payload for the seed device 100, among other factors.

The hair on the tip of an *Erodium* seed measures 20 μm in diameter. Among all the natural hairs evaluated, pony hair measured 20 μm, wolf hair 20 μm, weasel hair 40 μm, and human hair 80 μm in diameter. Thick hairs that generate too much friction during drilling are not usable. Pony hair is more uniform from the root to the tip, while wolf hair can double in diameter at the root. With a preference for uniformity, one method to achieve the preferred hair for the tip 110 of one embodiment of the present invention is to chop pony hair into 2 mm segments and flock them onto the tip's surface under electrostatic force, which guides the hair to be aligned perpendicularly to the tip surface (FIG. 8D, the scale bar for FIGS. 8A through 8D is 5 mm). This step immediately follows the coating of ethyl cellulose solution, so the hairs stick to the surface as the coating dries over 12 hours. Seed Device Design Tool In order to accommodate the previously mentioned geometrical constraints in the fabrication method 300 and enable the attachment of versatile add-on components, a novel design tool was developed in Rhinoceros® with Grasshopper® to assist the design and fabrication process 300. Both HCI researchers and domain-specific users who try to develop customized systems on seed device platforms can benefit from this tool.

Input Component and Adjust Seed Outline. Firstly, the software provides users with a basic shape of the seed device 100. The geometry and proportion of the essential components including the tip 110, body 120, and tail 130 are pre-determined based on quantitative experiments and are not modifiable in general. However, the interface will indicate a padding area 135 that allows for substantial change in outline (see FIG. 9A). This padding area 135 is designed to carry functional add-ons and payloads (e.g. sensors and displays). If the padding exceeds the allowable capacity, the total size of the seed device 100 can be proportionally enlarged (see FIG. 9B) to increase the load-carrying capability of the seed device 100. The adjustment for the padding area 135 is made on the 2D outline of the seed device 100 and reflected on the 3D rendering of the final shape of the seed device (see FIG. 9C).

Auto-Generate Molds and Outlines. A 3D mold, with which the users will shape the seed device 100, will be generated once the outline of the seed device 100 is finalized. The mold for the coiling body 120 and tail 130, along with a clamp to help with the molding and a two-part mold for the tip 110, can be printed with rigid resins. The outline of the seed device 100 is exported as a vector file for laser cutting a wood veneer.

Performance Evaluation

Figures 11A, 11B:
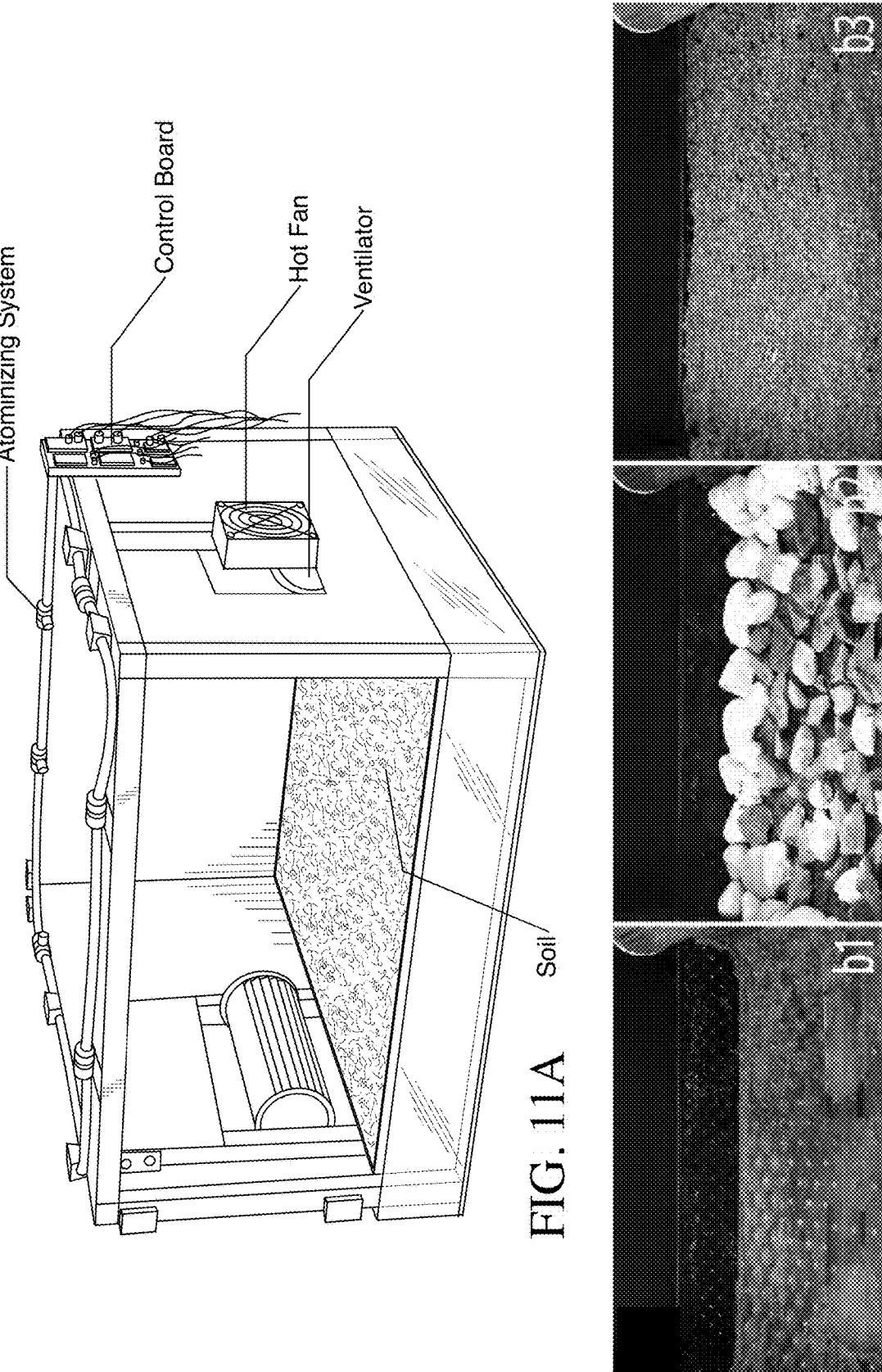
FIGS. 11A and 11B show one embodiment of a testing chamber for use with the present invention.

Soil Chamber for Controlled Test. The performance of one embodiment of a seed device 100 was evaluated in a customized testing chamber (FIG. 11A). A single layer of cobblestones (in the size range 5 cm to 10 cm) was spread across the bottom of the chamber, covered by 10 cm of fiber soil (see FIG. 11B). An atomizing system consisting of six brass misting nozzles with an orifice of 0.3 mm was hung above the chamber and connected to a 70 psi pressure pump for water supply to simulate raining cycles. Specifically, for all the drilling tests in this section, the pump is switched on for 3 seconds and switched off for 37 seconds, for a total of 30 minutes, to simulate rain. Then it is completely shut down for 30 minutes to simulate drying. The duration is set to make sure that all seed devices 100 are fully actuated to deliver the best performance. Additionally, two electric space heaters and two computer fans are added to circulate heated air and speed up the drying. The surface temperature of the soil is kept at around 30° C.

Drilling Test. In this test, the successful drilling rate of three different sizes of seed devices 100 (see FIGS. 10A through 10E) was quantified to validate their performance in the drilling phase (see FIG. 3B). Since the terrain condition and the soil texture can affect the success rate of seed establishment, terrain conditions were kept consistent by creating a crevice with an opening angle of 90° and a height of 2 cm for every tested seed device 100 in order to speed up the testing process, present a well-controlled experimental setup, and standardize the performance for all samples. Hence, all seed devices 100 were primed into a pre-drilled crevice while exposing the tip 110 to air (see FIG. 10A), giving them a starting advantage.

Test Results. The test results of these seed devices 100 justify a close resemblance of the biomimetic design, the efficacy, and the possibility of having a range of sizes of seed devices 100 to perform different roles.

In the test, each batch of seed devices 100, categorized by size, underwent four cycles of simulated rain and drying. Continuous rain and drying cycles wet the whole soil bed without allowing it to dry below the surface and condense the soil, so the test stopped after four cycles. During the four cycles, the cycles at which the seed devices 100 reach 30% burial (anchoring 230) and 80% burial (establishment 240) were recorded by measuring the length of the exposed tip 110 as a fraction to the whole tip 110 length. These standards are set based on the observation that a seed device 100, in one embodiment, is securely anchored 230 at 30% burial and likely to proceed with drilling; when a seed device 100 of the present invention reached establishment 240 at 80% burial depth, its tail 130 would likely lift up (FIG. 10B) and the seed device 100 will effectively install.

The results in FIGS. 10C through 10E suggest similar patterns of drilling success among seed devices 100 of three sizes, but the slight differences suggest their respective advantage. The reactivity of the seed devices 100 to the same watering condition is higher with small seed devices 100, because they absorb water more effectively and uncoil faster. Specifically, it was observed that the small, medium, and large seed devices 100 completely uncoil during the hydration period in 10, 18, and 25 minutes respectively. Therefore the small seed devices 100 anchor most rapidly, making them useful in places with limited water supply.

The thrust force generated by the coiling and uncoiling behaviors, however, is greatest in the large seed devices 100 due to their size and strength. This means that after anchoring 230 is complete, the large seed devices 100 reach the establishment state 240 in the fewest cycles. It also was observed deeper burial after all cycles complete for large seed devices 100. Large seed devices 100 are recommended in regions where water supply is ample and depth of burial is prioritized over speed of establishment.

The medium seed devices 100 have a balanced performance between the water responsiveness and the rate of establishment. In the next two subsections, the load carrying capacity and the repeatability of the three sizes is discussed.

In all the drilling tests, the establishment was not 100% guaranteed within 4 cycles. While drilling is a gradual process that tends to reach 100% after repeating more cycles for both real and artificial seeds, it was observed that slow or unsuccessful drilling of a few seed devices 100 is likely a result of the random uncertainty in fabrication (e.g. slightly more porous and thinner wood veneer would render the resulting seed device 100 weaker) and rotation that causes tilted gravity and flipping.

Figure 12A:
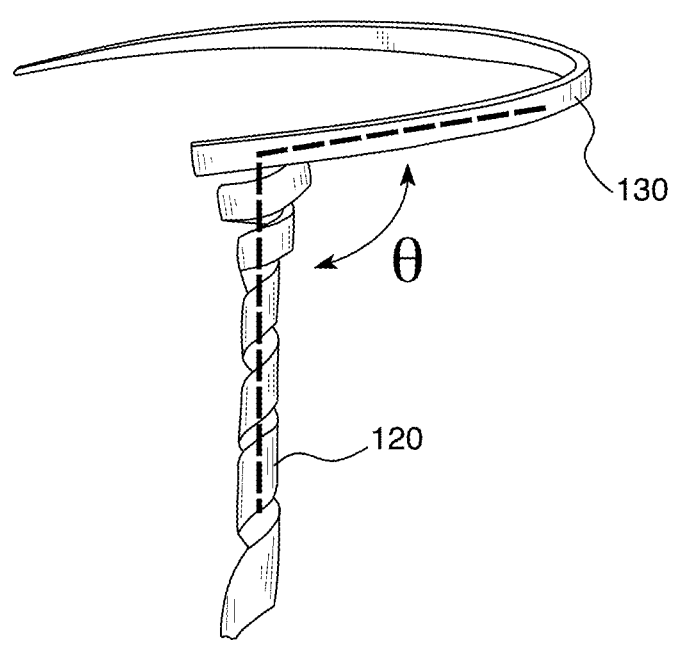
FIGS. 12A and 12B show a loading test for one embodiment of a seed device according to the present invention.
Figure 12B:
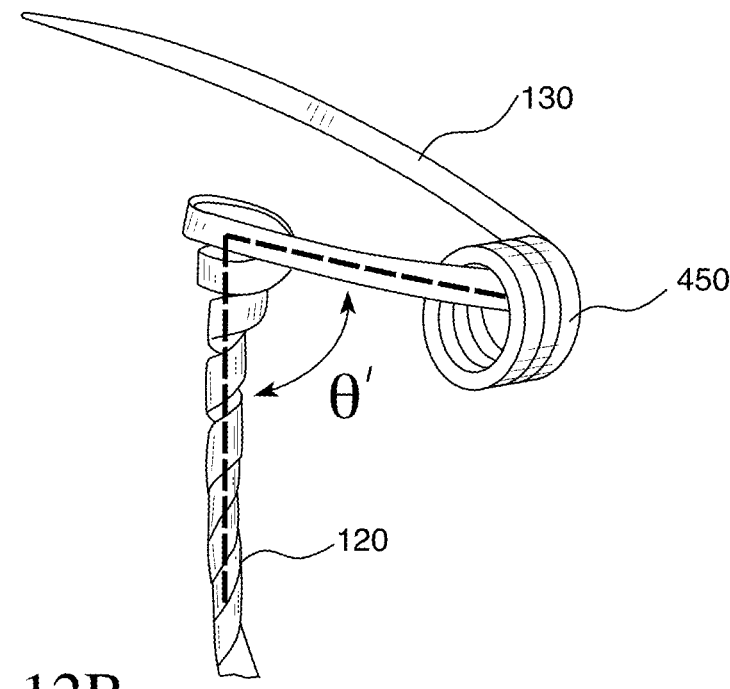

Preliminary Loading Test. A series of loading tests was performed on the three sizes chosen in the drilling test and further quantified the amount of load each size can carry without functional failure (see FIG. 12). FIGS. 12A and 12B illustrate an external load 450 attached to one embodiment of a seed device 100, which can deform the body 120 and affect the morphing drilling performance. Specifically, loads 450 were applied to the padding region (FIG. 12B), where the most effective load-bearing area in the seed device 100 design was identified. The load 450 was attached to one embodiment of a fully hydrated seed device 100, and the deflection angle of the tail 130 was measured as the seed device dried and coiled in open air. A seed carrying no load and drying under the same condition is used as the reference point for calculating the deflection angles. The loads 450 were increased incrementally by 0.15 g until the seed device 100 could not coil back.

Test Result. As expected, the amount of load that the seed devices 100 of the present invention can carry before yielding increases with the size of the seed device 100. The smallest seed device 100 of one embodiment of the present invention yields with 0.45 g of loading, the medium with 1.05 g, and the largest with 1.2 g. Considering the application implications for three different sizes of seed devices 100, the smallest anchors most effectively but carries the least load and may only be capable of delivering small plant seeds. The medium is the most versatile size because it is easy to manipulate, can carry reasonable numbers and sizes of plant seeds or electronic loads. The largest carries heavier loads but will only be effective in terms of drilling if there is ample water supply.

Figure 13:
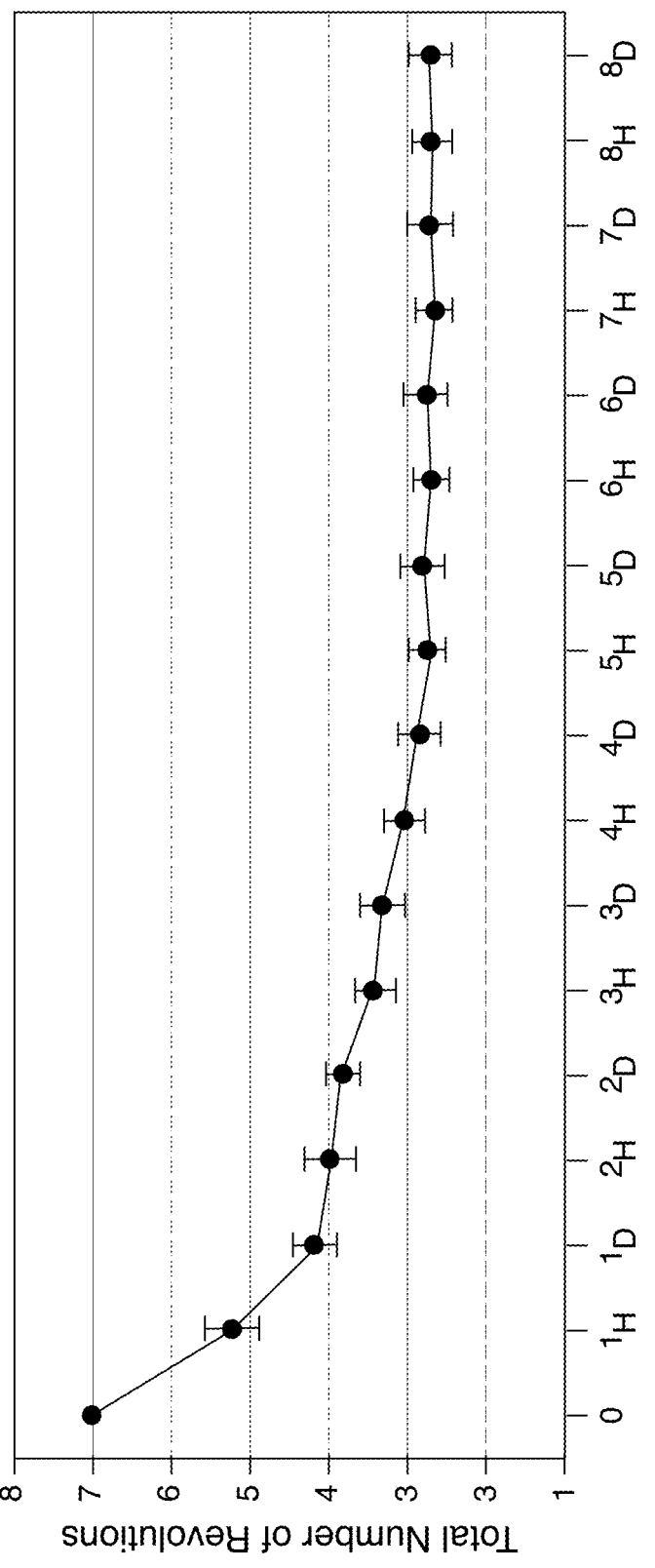
FIG. 13 is a graph illustrating the relationship between total number of revolutions and the cycle of hydration and dehydration.

Repeatability Test. Certain embodiments of seed devices 100 went through multiple hydration-dehydration (i.e. uncoiling-coiling) cycles to test the repeatability (see FIG. 13). The total number of revolutions in each cycle was counted and plotted. The more revolutions a seed device 100 can have within a cycle, the higher chance it will drill deeper in fewer cycles. FIG. 13 shows that after 8 cycles, although a decreasing trend is observed in the first few cycles, the tested seed device 100 maintains almost 3 effective revolutions at last.

Soil Binding Test. After each size of seed device 100 was successfully anchored (30% burial) and established (80% burial), the binding strength was further verified between seed tips 110 and wet soil. Compressed air was used to simulate different speeds of wind blowing, and increased air flow speed until the tested seed devices 100 left the previous position. It was observed that anchored seed devices 100, regardless of size, were able to withstand a simulated 12 m/s wind (tree branches will sway). Established seed devices 100, on the other hand, could withstand 20 m/s wind blowing (difficult to walk against the wind).

Results from Additional Research and Testing

Materials and chemicals. The following research and testing on one embodiment of a seed device 100 and fabrication method 300 was performed using white oak in quarter-sawn cutting. Sodium hydroxide, sodium sulfite, and filtered water were used for partial delignification chemical baths. Pearlite was purchased from local suppliers.

Process towards hygromorphic actuators. For the specific experiments, described in this section, 3 cm-thick white oak in quarter-sawn wood lumber was sawn into a block with dimensions of roughly 20 cm by 40 cm with the long edge being parallel to the grain. The block was then sliced into four to five thin sheets, the wood sheeting step 320, each run through a drum sander to further reduce the thickness until it reached the desired value. The wood veneers obtained after this step had a range of thickness from 0.4 mm to 0.8 mm. All the test samples and application examples were outlined in Rhinoceros®. The outlines were sent to a laser cutter and cut from the wood veneer with the required thickness. Before cutting, the exact location of the outlines was visually inspected to avoid tree rings and Medullary Rays in the white oak. For the washing 330 step, the obtained strips were then immersed in a boiling aqueous solution of 2.5 M NaOH and 0.4 M Na2SO3 for 10 minutes, followed by rinsing in boiling water with gentle agitation three times until water was clear. For the molding step 340, to make the coiling actuators, the veneer strips were pat-dried on a paper towel and sat in open air for 1 minute before molding tightly on a prepared mold with calculated curvature. For the fully biodegradable seed device 100 embodiments, the tip 110 was made of a dough consisting of 42 g flour and 112 mL water, shaped by a two-part mold (the tip molding step 340). After the dough dried completely after 12 hours (the drying step 350), the tip 110 was dipped in a 20 weight percent ethyl cellulose/ethanol solution twice for waterproofing. Immediately after the second dip, the tip 110 was coated with a uniform layer of horse mane hairs cut into 2 mm fibers by electrostatic flocking (the hair flocking step 370).

After comparing different woods and bamboo, white oak was chosen for its superior strength and uniform fiber alignment. Flat sawn cutting for the veneer sheeting works because it gives a clear fiber alignment without ray patterns (FIG. 18C). While the results indicate a 15-20% increase in hydration-induced radial and tangential dimensional changes from raw, natural wood to partially delignified wood without external strain after chemical treatment, the longitudinal dimension merely changes 1-3% pre- and post-treatment. Yet to harness the maximal strength of wood which is along the cellulose fibril orientation, the bending or coiling actuators are molded so as to introduce gradient compression along the fibril orientation. The large molding curvature is enabled by partial lignin removal as lignin provides wet wood strength and the chemical treatment increases the wood's malleability.

As a result of the processing procedure, the thickness of the actuator was decided by the precision of the machine during wood preparation, the diameter of the coil was determined as the minimum size before the coil fractures during wet molding, and the width, coupled with the thickness and the diameter, was made as large as to increase I without sacrificing tightness.

Mechanical tests. All tensile tests were performed on an Instron 5500R using a 500N load cell. The dimensions of the test samples were 4 mm by 40 mm by 0.5 mm. The samples were clamped at both ends and stretched at a speed of 0.05 inch/minute along the fibril direction of the wood until the sample fractured.

Actuator Processing Method. The efficacy of the approach outlined in this section relies on partial lignin removal coupled with mechanical strain-induced non-uniform swelling to harness the hygromorphic power of delignified wood. The schematic in FIG. 18A shows one embodiment of a five-step fabrication method 300 according to the present invention to directly transform bulk wood into a hygromorphic coiling actuator (a seed device 100). The approach involves the sheeting 320 of wood veneer into the suitable thickness, the partial removal of lignin and hemicellulose via a short boiling process 330 in an aqueous mixture of sodium hydroxide (NaOH) and sodium sulphite (Na2SO3) to improve the moldability of the wood veneer, followed by a wet molding 340, a releasing 345 and a drying step 350.

Figure 19:
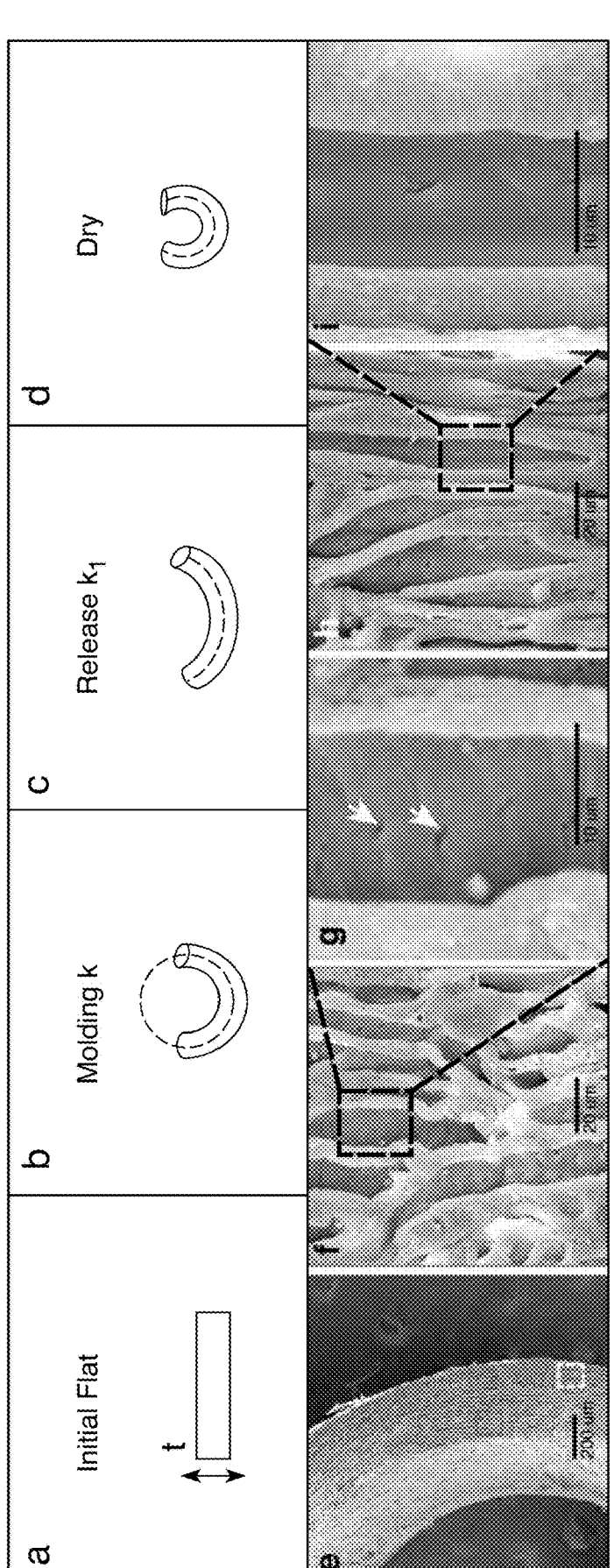
FIG. 19 illustrates the mechanisms of curvature formation and hygromorphic actuation of one embodiment of the present invention.

The sequential molding 340, releasing 345 and drying 350 steps play a critical role for the molding of the maximum initial curvature. While the wet molding step 340 sets an initial bending curvature, the releasing 345 (while the wood is still wet) and drying 350 steps will induce further increase in the bending curvature (see FIG. 19 details a through d). First, a piece of treated wood veneer is pressed against a mandrel (FIG. 19b, the molding step 340). The wood veneer is then released 345 to dry 350 in open air, and at this step, it relaxes immediately after being released to a reduced curvature (FIG. 19c). It continues to tighten, reaching its maximum curvature that is larger than the molding curvature (FIG. 19d). This mold-and-release approach leads to the existence of both elastic and plastic deformations on the microstructure of the cellulose scaffold as soon as the wood veneer is deformed.

Actuator Shape and Working Mechanisms. The hygromorphic reaction and mechanical durability of the actuator depend on the chemical treatment and the integrated elastic and plastic deformations. In pre-molding samples, the weight fraction of lignin and hemicellulose determines the strength of hydrated wood and hygromorphic reaction rate and can be controlled by the classic sulfite process, in which sodium lignate is formed through the hydrolyzation of the sulfite group and the ether group in lignin and then removed. Meanwhile, the condensation reaction also occurs at high temperature alkaline treatment with the addition of sodium hydroxide, which makes the lignin network more entangled and resistant to removal. The recipe in this research leveraged the formation of a lignin network that is not completely deteriorated during chemical washing in the wet state while allowing elastic and plastic deformation post-treatment. This process softens the wood sheets and increases the stretchability, making them suitable for large curvature molding.

The microscale structures of the wood veneer also were examined at the dry state using scanning electron microscopy images, which can be seen in FIG. 19 details e through i. It was found that the wood cells towards the inner side (FIGS. 19f and 19g) have more wrinkled cell walls than those towards the outer side (FIGS. 19h and 19i), an indication of large compression on the inner side.

Hydration-induced swelling of wood tissues depends on the microfibril angle ("MFA") of the tubular cells. Based on the Fratzl-Elbaum-Burgert model, the preferable swelling in the radial and tangential directions is the result of MFA less than 45° in the secondary cell wall. The molding process 340 induced localized compression in the innermost layer (FIGS. 19f and 19g), increasing the MFA and making it prone to elongation in the hydrated state (L=a+b cot θ, where a and b are species-specific constants, θ is MFA).

Actuator Performance. The recoverability and actuation amplitude over three hydration-dehydration cycles for both bending and coiling actuators was also evaluated. For simple bending actuators, the test actuator was placed in a water tank at 25° C. for hydration and in air for dehydration. The side-view illustrations are shown in FIG. 19, Details a through d.

Figure 20A:
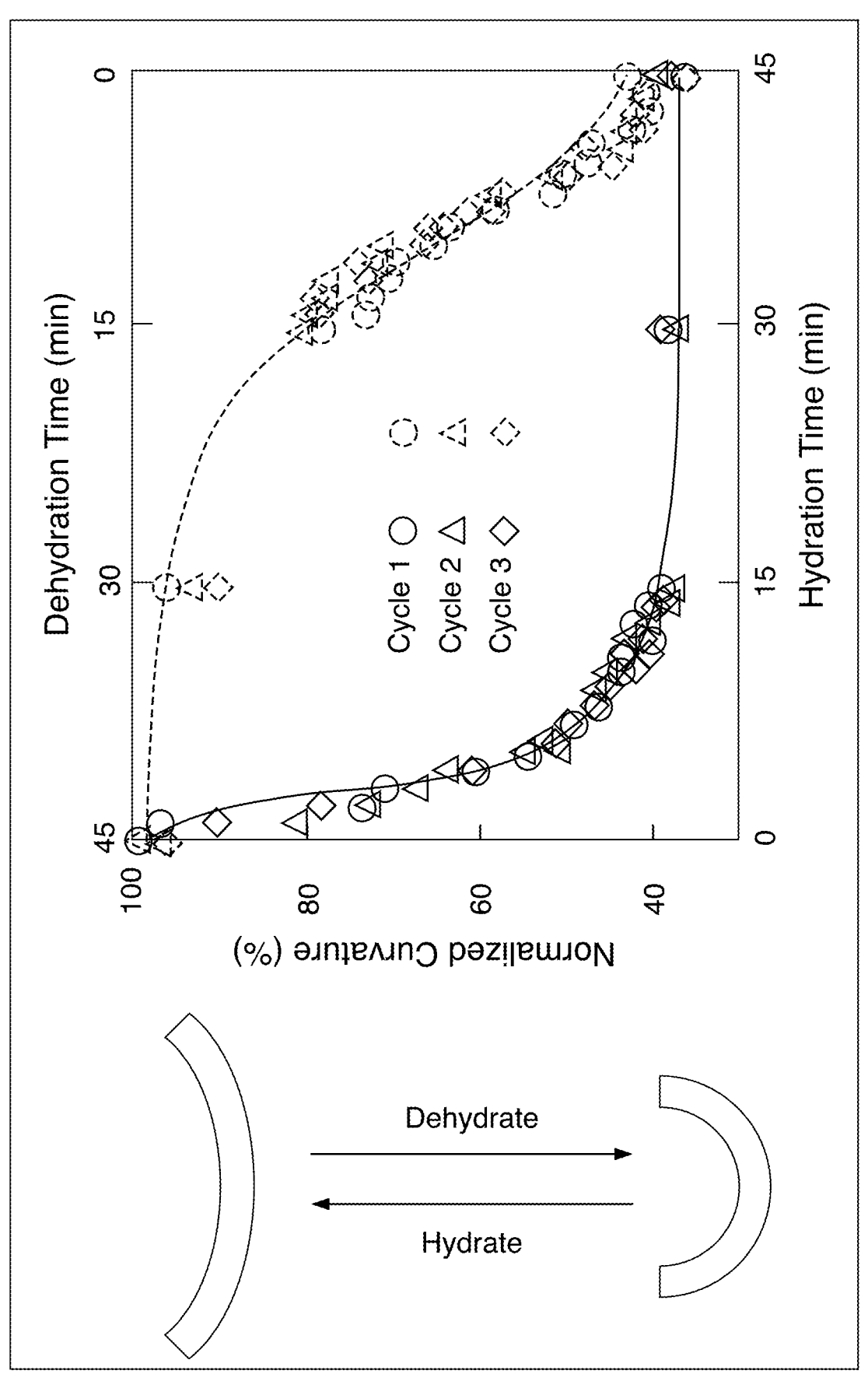
FIGS. 20A through 20D illustration various aspects of actuation performance of the different embodiments of the present invention.

A simple bending actuator in the shape of a half ring was first measure by recording the curvature change with time to prove that a combination of partial elastic and plastic deformations grant reversible hygromorphic actuation that retains 96% of its original curvature after three cycles of full hydration-dehydration (FIG. 20A). When the washed wood veneer is molded as a helical hygromorphic actuator (FIG. 20B), a maximum curvature of 1800 m-1 is obtained after the release 345-and-dry 350 process. In practice, a 20% decrease in dry curvature is observed after the first hydration-dehydration cycle, possibly due to the permanent damage of the cellulose fibers during the molding process. For the helical actuator, the curvature in the fully dehydrated state after the first hydration-dehydration cycle remains relatively constant thereafter. On the other hand, the actuation amplitude, measured as the curvature change between the rest state and the actuated state, is superior over previously reported synthetic hygromorphic actuators with a value of 900 m-1.

An engineered coiling actuator beyond the natural *Erodium* seed body has the benefit of customizable geometry and spring stiffness. The extension force of the coil, P, can be estimated as $P{\sim}\delta Ebt^3/lD^2$, where $\delta$ is the axial displacement during hydration and dehydration cycles, E is Young's modulus, b and t are the width and thickness of the cross-section, respectively, l is the total length of the active length of the coil, and D is the diameter of the coil. The extension force during the hydration of the actuator can be customized by tuning the geometrical factors of the coils, such as the thickness and the width of the wood veneers. Overall, the coiling actuator can generate a larger force with the same displacement if the coil is stiffer, thicker, wider, tighter, and shorter.

Figure 20B:
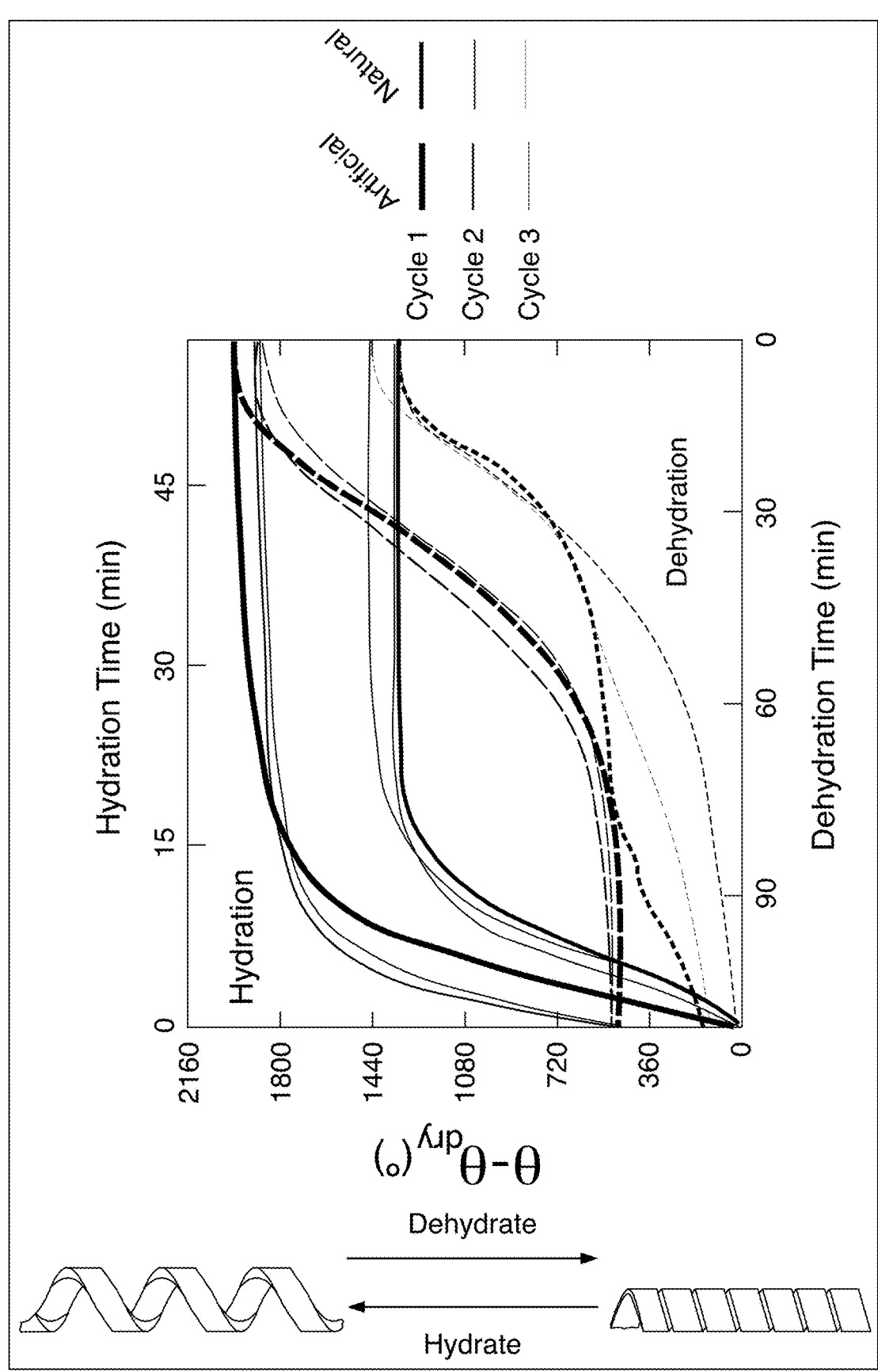
Figure 20C:
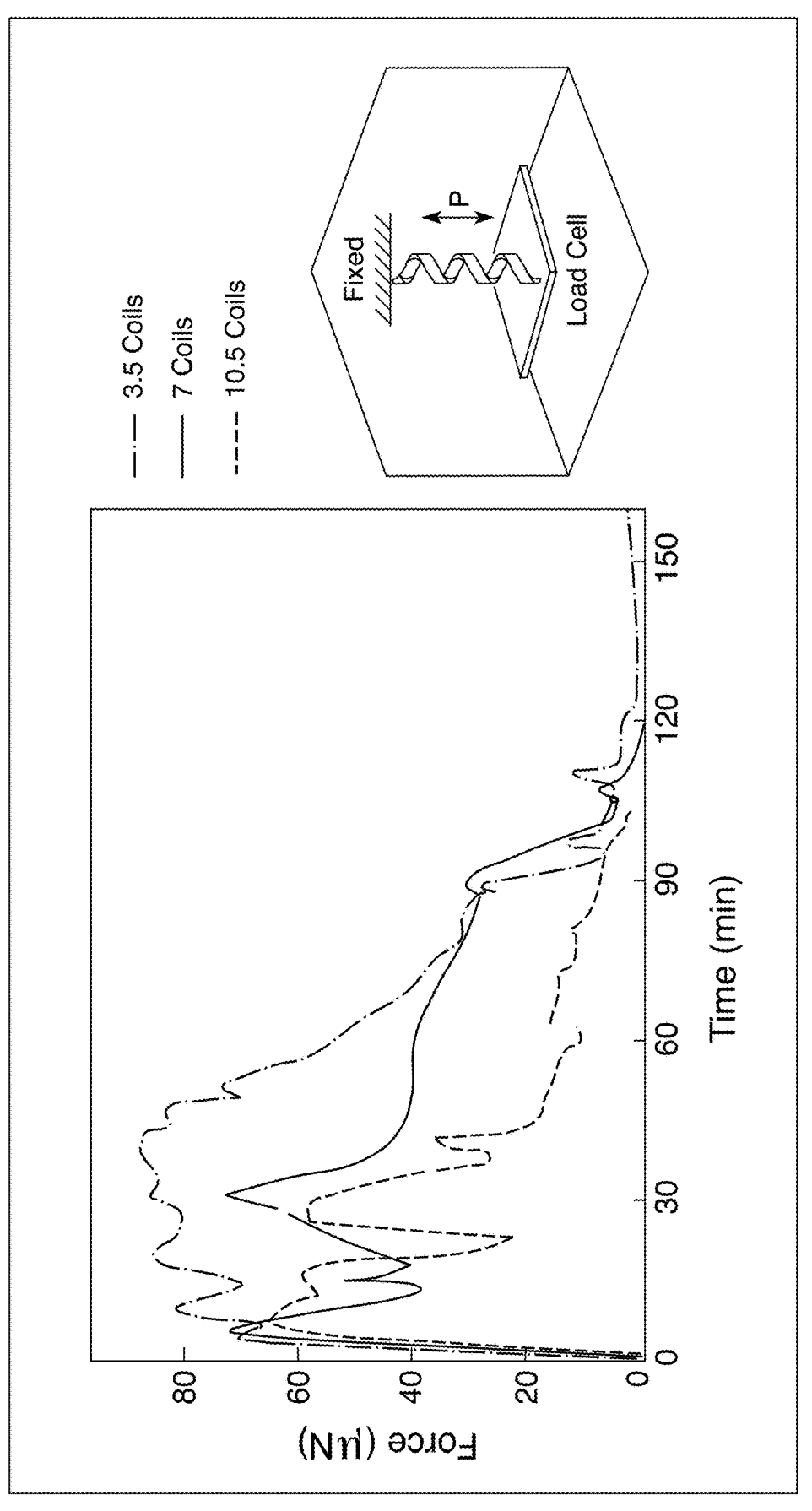

Mechanical tests were conducted in a customized humidity chamber to quantify the effect of l by keeping b and t constant across samples. As shown in FIG. 20C, the test coil was placed inside a closed cubic chamber with a side length of 20 cm. The top of the test coil was clamped firmly. The test coil was hung before the test. As the test began, the chamber was filled with circulating humid air. When the relative humidity reached 100% and the temperature reached 30° C., the test coil is brought above the force measurement plate as close as possible without exerting positive force on the plate and the force measurements were recorded as the reading became positive. FIG. 20C shows the profile of the change in thrust force with time that complies to the proportionality where P with increase with decreasing l. Since the number of coils is proportional to l among the engineered actuators, the total number of coils affect the peak forces, with the smallest total number of coils (3.5) measured having the largest peak force of 90 mN, which is twice as large as the natural *Erodium* actuator with the same number of coils (43 mN).

Figure 20D:
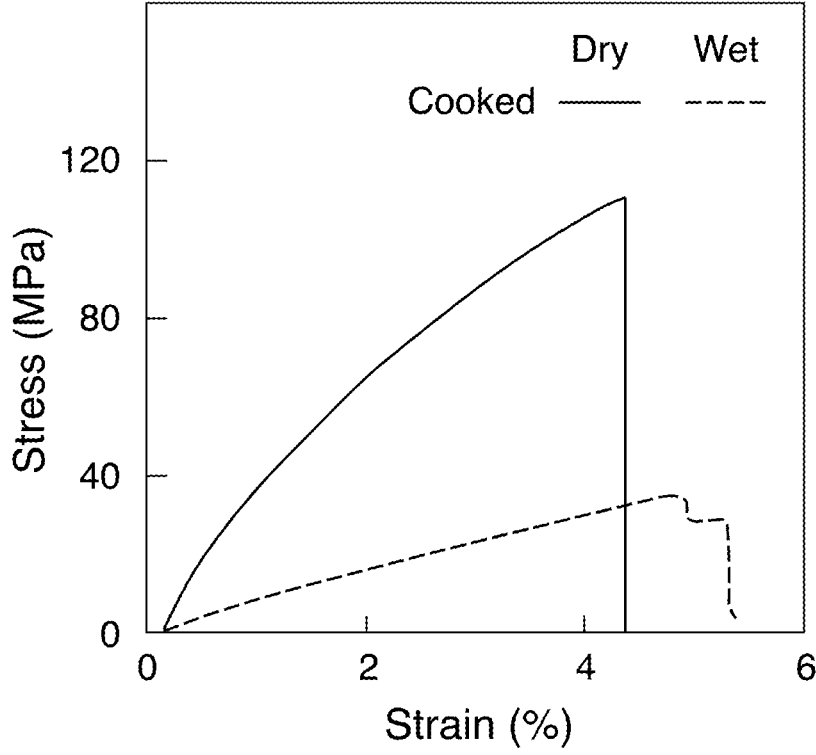

FIG. 20A is a diagram showing the reversible actuation of the molded bending actuator, and curvature changes of the molded bending actuator in three consecutive hydration-dehydration cycles. The sample was a wood strip with 3 mm in length, 3 mm in width, and 0.5 mm in thickness, molded with a mandrel that is 0.8 mm in diameter. FIG. 20B is a diagram showing the reversible actuation of the molded coiling actuator, and angle changes relative to the initial position of the top end (θ−θdry) of the molded helical actuator in three consecutive hydration-dehydration cycles. FIG. 20C shows the thrust force measurement with time as the test coil was hydrated for 90 minutes and dehydrated until the test coil lost contact with the load cell. The inset shows the measurement setup in a closed chamber able to fill and vent humid air. FIG. 20D shows the tensile test of the wood striped used to make the coiling actuators.

Design of Biodegradable Self-drilling Payload Carriers. To demonstrate the customizability of one embodiment of a method to design effective hygromorphic actuators for different application contexts, a series of biomimetic self-drilling seed devices 100 with a coil configuration were created by using a mold (FIG. 18A) to guide precise shaping of the wood actuator. Inspired by the seed awn of *Erodium*, the hygromorphic carrier has a tight coiling body 120 connected to the curved tail 130, molded and shaped with one piece of wood veneer. The hygromorphic actuator production process allows for the modification of the geometry of the coiling body 120 and tail 130, and for the tailoring of the self-drilling seed device 100 to different terrain conditions and force requirements.

Figure 21A:
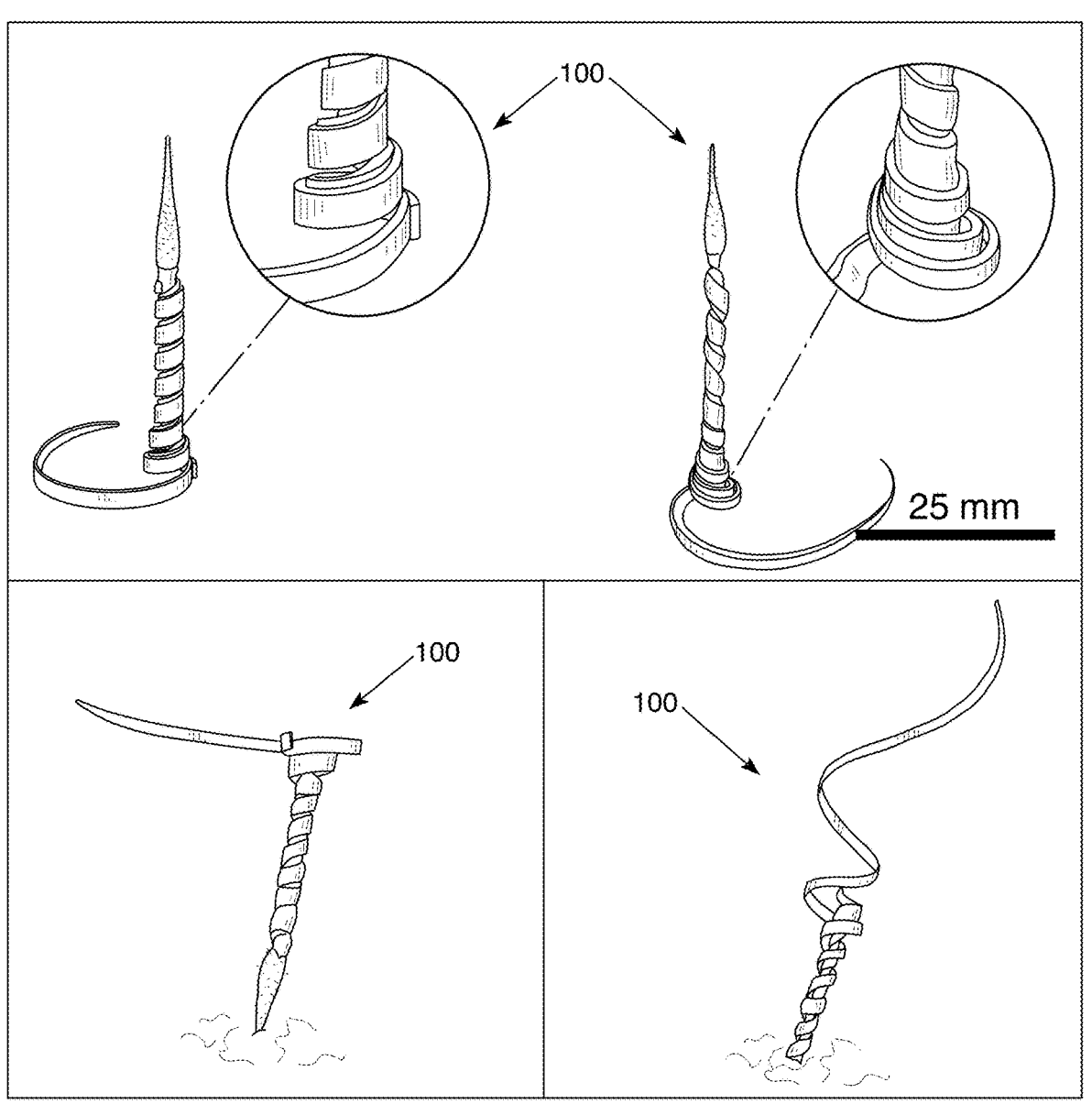
FIGS. 21A through 21D show *Erodium*-inspired biodegradable self-drilling carrier designs and performance according to various embodiments of the present invention.
Figure 21B:
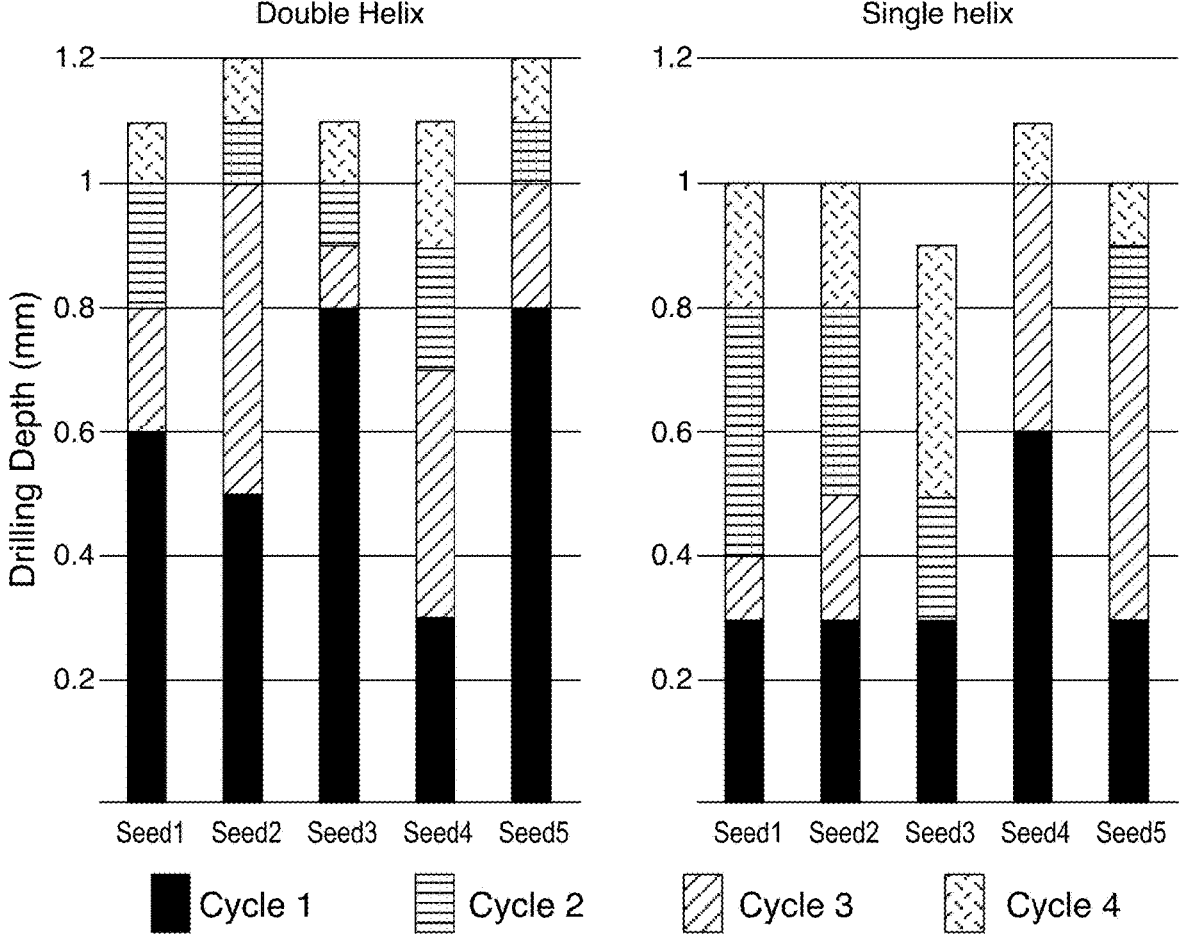
Figure 21C:
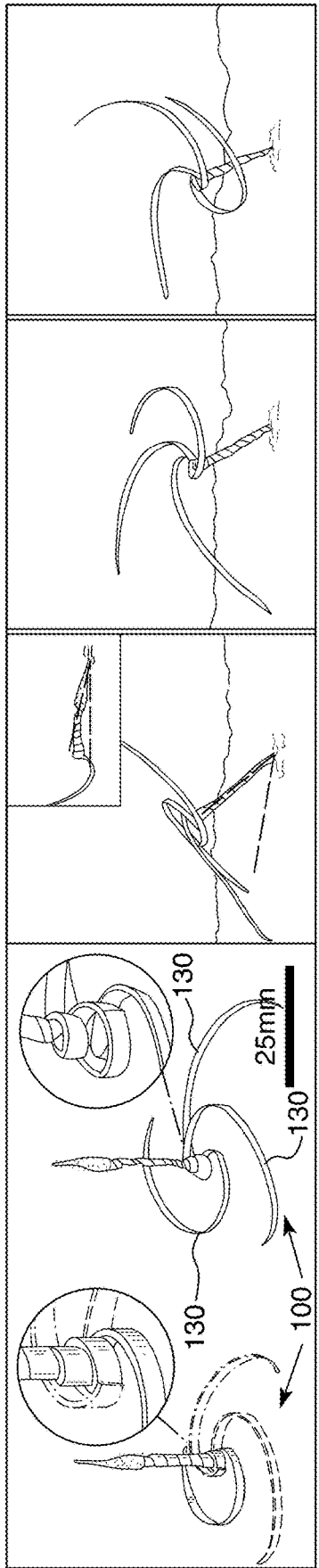
Figure 21D:
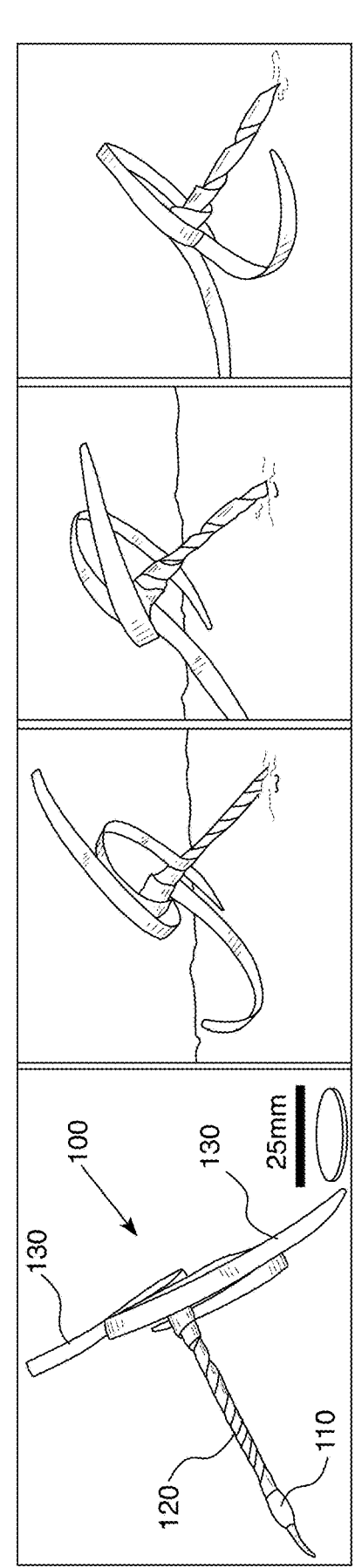

In this biomimetic self-drilling seed device 100 of one embodiment of the present invention, thrust force from the coiling body 120 is critical to enable the drilling. To increase the thrust force for more efficient drilling, an extra layer of the coiling body is overlaid to form a double-layer 7-coil body (see FIG. 21A). This configuration generates a larger thrust force (94 mN) than a single-layer 7-coil (74 mN), with only a slightly delayed response due to the moisture barrier from the outer layer.

Drilling test. The drilling performances were validated in two settings: lab setting and semi-open environment. The lab setting consisted of a timed misting system hanging above a 50 cm by 50 cm testing area covered by a single layer of cobblestones underneath a 10 cm layer of soil. The soil was textured with 3 cm deep conical crevice in order to facilitate the drilling process. 30 minutes of intermittent misting intervals driven by 70 psi pressure supplied water to simulate raining, and 30 minutes of fanned warm airflow was supplied to simulate drying. The surface temperature of the soil was kept at around 30° C. In a drilling test, the drilling depth of the carriers with single and dual-layer coil bodies was compared under the same triggering and soil conditions. The results suggest that while most of the tested seed devices 100 with a single-layer coiling actuator can bury the tip 110 15 mm down into the soil, the tested seed devices 100 with a double-layer coiling actuator were able to bury 18 mm down into the soil, which lead to an application scenario that requires deep burial of beneficial microorganisms for the soil, which is detailed in the next section.

In addition, an initial inclination (the relative angle, α, in FIG. 18C) between the coiling body and ground can be introduced to further increase the vertical thrust force thus the chance of successful drilling. FIG. 4*b* shows a design variation from the natural *Erodium* seed awn with two additional tails 130 in order to lift up the coiling body 120. The natural *Erodium* seed awn, once launched from the plant, moves the seed across the surface, eventually lodging the tip into a crevice and settling on a sufficient initial angle. This searching process inevitably and uncontrollably requires more cycles before the seed finds a lodging crevice and is inefficient on relatively flat terrains. To establish the seed device 100 at a more efficient angle to initiate the drilling, one embodiment of the present invention utilizes a tri-tail 130 seed device 100 so as to control the relative angle, α, between the drilling tip 110 and the terrain surface. An experiment was conducted by dropping both one-tail and tri-tail seed devices 100 ten times from 0.3 meter above a soil surface made of pearlite. Compared with one-tail natural seeds which have an 80% chance to land flat, this three-tail seed device 100 has a 90% chance of landing at an angle, which was considered to improve the drilling efficiency. A follow-up drilling test with seed devices 100 of each type indicated that four out of five tri-tail seed devices 100 successfully established themselves after two hydration-dehydration cycles, while there was only one out of five one-tail seed devices 100 achieved establishment under the same testing condition after four timed cycles were. The testing result suggests that tri-tail seed device 100 is effective in relatively flat terrains where searching for crevices to establish an effective initial angle is difficult.

Concerning the drilling efficiency of the seed device 100, another critical parameter is the spinning velocity of the tip 110, which is determined by the rotational speed of the tail 130 due to the coiling/uncoiling cycle of the coiling body 120. This is because a higher rotational velocity at the tip 110 reduces the drag force between the tip 110 and the soil, which reduces the minimum thrust force needed and facilitates easier drilling. For one embodiment of the present invention, the molded coiling actuator with 7.5 coils has a larger accumulated rotational angle thus rotational velocity at the end than the natural *Erodium* coil. In practice, the rotational velocity can be tuned by tuning the total number of coils as the two are directly proportional. The total number of coils in the body 120 is determined by fixing the values of 1 and D of the awn, and the rotational speed and effective number of turns that a coil could generate during hydration or dehydration are directly proportional to the total number of coils in the body 120, hence 1. However, further increase of the number of coils will increase the body length, leading to smaller spring constant and thrust force for the coiling body. Therefore, for one embodiment of seed device 100, a total coil number of 7 was chosen such that it provided both sufficient stiffness and a comparable rotational velocity compared to a naturel *Erodium*. Depending on specific applications, different embodiments of the seed device 100 could be further tailored by balancing the thrust force of the coil and drag force at the tip 110.

FIG. 21 illustrates various embodiments of an *Erodium*-inspired biodegradable self-drilling seed device 100 and their performance. FIG. 21A is an illustration of one embodiment of a double-helix seed device 100. The tip 110 of the seed 100 progressed faster. FIG. 21B shows the drilling depth profiles of five double-helix seed devices 100 in comparison to five single-helix seed devices 100 within four hydration/dehydration cycles. FIG. 21C is an illustration and a photo of the 3-tail seed device 100 according to one embodiment of the present invention. Immediately before the drilling, the seed device 100 was able to stand with a larger initial tilting angle, α, relative to the ground as compared to the natural *Erodium* seed in the inset. As the drilling proceeded, the tails became airborne (see FIG. 21C). FIG. 21D is an illustration of a giant seed device 100 according to one embodiment of the present invention and sequential photos of the establishing process.

Applications

Some embodiments of the present invention encompasses electronic-free or digital design seed devices 100. For analog embodiments, electronics are not attached to the seed device 100. For digital embodiments, on the other hand, lightweight electronics can be attached to further augment the functionalities of the seed device 100.

Electronic-free Design: Vision-Based Remote Monitoring. One of the ultimate applications of the various embodiments of the present invention is to massively deploy seed devices 100 in remote areas as an interface to receive and transmit information from their surroundings. Seed devices 100 of the present invention can be subject to large-scale deployment using drones. This application would benefit from using computer vision to determine the percentage of burial of the seed devices 100.

During the research of the present invention, one embodiment of seed devices 100 were dyed with fluorescent paints in three colors that marked two tip sections 110 and the body 120 under UV illumination. The fluorescent colors can be clearly captured by camera under UV light (see FIG. 14A, showing poor ambient light, and FIG. 14B showing UV light at night). An image processing tool was used to compute the ratio between the two distinctive colors at the tip 110 and recognize the burying percentage. FIG. 14C illustrates the identification of tip burying percentage by use of a customized image processing tool with a scale bar of 10 mm. The length ratio between the exposed sections of different colors reflects the depth of drilling, and the colored body indicates the position. Since the ratio of the colors will change with the camera angle, the percentage will update as the camera moves.

Digital Design: Interactive Garden. One example of a digital design application is the interactive design of one embodiment seed devices 100 embedded with radio-frequency identification ("RFID") tags. RFID tags present unique advantages as the approach is battery-free, tether-free, and writable. For one embodiment of this application, the RFID tags light up when they are within the range of a near field communication ("NFC") reader. Mobile phones can function as the NFC reader to turn a seed device 100 into a digitally rewritable tag with which many users can interact. This application can be broadened into interactive setups, including but not limited to, in arboretums or museums to trigger reactions from the garden (e.g. lighting up as in FIG. 15, singing a tune, providing additional digital information about an exhibit). FIG. 1A shows a multifunctional seed device 100 according to one embodiment of the present invention. FIG. 1B shows a seed device 100 of the present invention with a RFID sensor 410. FIG. 1C illustrates a seed device 100 of the present invention with a range sensor 440 incorporated into it. FIG. 1D illustrates a fluorescent-painted seed device 100 of the present invention. For embodiments that incorporate sensors, displays, processors, transmitters and/or electronic or digital payloads, those embodiments may also incorporate power sources and processors for the electronic devices and payloads.

Digital Design: Environmental Sensing and Mothership Extension. Another possible application of the technology of seed device 100 is as a sensor platform for personalized farming. This application can encompass the interactive sensing capability of one embodiment of a seed device 100 with a central hub 400 (see FIG. 16). Inspired by trees with a network of roots that communicates and functions in synergy, four seed devices 100 with customized light intensity sensors were spread and wired back to a mothership in the shape of a pillar, carrying the control board and power source (see FIG. 16A). Each seed device 100 had a sensing capability to cover a certain area. Like a scarecrow, when an invader, such as a wild animal, comes into the range of the light sensor, it triggers the mothership to emit light and sound to drive out the threat (see FIG. 16B).

This 'root' configuration that involves a 'mothership' and multiple seed devices 100 allows for integration of more power-consuming microcontrollers and other larger electronics using the technology of the present invention. It also provides a potential recycling strategy by tracking down all the connected seed devices 100 from the central hub 400, as once a seed device 100 is equipped with electronics, recycling has to be considered systematically.

The devices and methods of the present invention encompass a novel design and the fabrication of a morphing carrier, inspired by nature and designed for natural contexts such as agriculture, environmental sensing, and natural conservation. Although rooted in material engineering and passively (i.e. environmentally) responsive behaviors, the seed devices 100 and fabrication method 300 is a 'morphing mobile platform' that researchers in the field of HCI can easily leverage to integrate different sensing, actuation, and computational powers into their field-based functional devices.

Figures 22A, 22B:
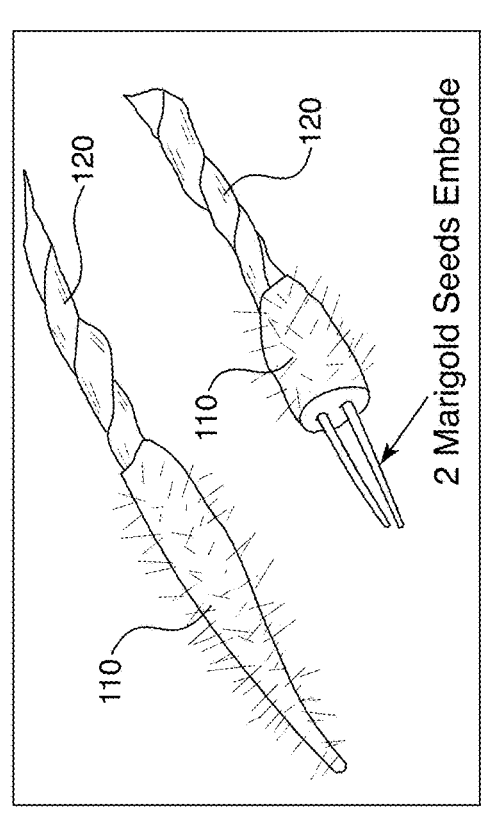
FIGS. 22A and 22B show variations of designs and applications of the biodegradable and self-drilling seed devices of the present invention.

Seed Distribution in General. Research on the present invention included engineering a biomimetic tip 110 with different embedded payloads. The method included constructing the tip 110 of starch, ethyl cellulose and angled bristles. FIG. 22A shows that the wildflower seed, marigold (*Eschscholzia caifornica*), embedded in the tip could successfully germinate within a week. FIG. 22B shows the marigold seeds germinated after 56 hours in a controlled environment.

Seed Distribution in Farmland. Further field tests were performed with drone delivery of seed devices 100 in a farmland in the northeastern U.S. in the early spring. It was observed that the seed devices 100 can successfully drill after a few rain cycles. Embedded seeds started to germinate after a week.

Conclusions

Research on the certain embodiments of seed devices 100 tested the validity of fully biodegradable seed devices 100 made entirely of artificial components in a semi-open environment. Various embodiments of seed devices 100 of the present invention were capable of drilling into semi-natural soil when rainfall occurred. The applications of the present invention beyond those detailed herein include quick deployment of seeds, microorganisms or functional sensors in hard-to-reach places through aerial delivery, for agriculture, reforestation, environmental conservation, sand solidification in environmentally polluted regions, etc.

While the disclosure has been described in detail and with reference to specific embodiments thereof, it will be apparent to one skilled in the art that various changes and modifications can be made thereto without departing from the spirit and scope of the embodiments. Thus, it is intended that this application covers modifications and variations of this disclosure provided they come within the scope of the appended claims and their equivalents.

What is claimed is:

1. An artificial seed device configured to self-drill into a substrate for transport of a payload, the device comprising:
   a body, comprising wood, that coils and uncoils in response to changes in humidity;
   a tip attached at a first end of the body;
   at least one tail attached at a second end of the body; and
   a payload attached to or incorporated into at least one of the body, the tip and the at least one tail.

2. The device of claim 1, wherein:
   the tip is rigid and pointed;
   the body is configured to generate a downward thrust force while coiling and uncoiling to drill the device into a crevice in the substrate; and
   the tail is curved to provide support against the substrate to facilitate drilling.

3. The device of claim 2, wherein the tip comprises a plurality of hairs on the tip.

4. The device of claim 1, wherein the body is comprised of a wood veneer.

5. The device of claim 4, wherein the wood veneer is selected from the group consisting of oak, maple, and bamboo.

6. The device of claim 4, wherein the wood veneer is a double layer of wood veneer.

7. The device of claim 1, wherein the payload is a compound selected from the group consisting of one or more of seeds, fertilizer, and microorganisms.

8. The device of claim 1 wherein the payload is at least one sensor for sensing and collecting collect information relating to the environment around the device.

9. The device of claim 8 wherein the payload further comprises an electronic display attached to the device and associated with the at least one sensor for displaying the collected information.

10. The device of claim 8 wherein the payload further comprises a wireless transmitter for transmitting the collected information to at least one of an external display, an external data collection repository, an external network and one or more other devices.

11. The device of claim 1 wherein the payload further comprises at least one of a marker or indicator to aid in locating the device.

12. The device of claim 1, wherein:
   the tail has a distal end located remotely from the body, and
   the tip is inclined upward at a minimum angle of about 30° from the horizontal plane of the substrate when the end of the tail rests on the substrate.

13. A method of implementation of a self-drilling device for transport of a payload, the method comprising:
   selection of at least one artificial device, the device comprising:
      a body, comprising wood, having a first end and a second end, wherein the body coils and uncoils in response to changes in humidity and the body is configured to generate a downward thrust force while coiling and uncoiling to drill the device into a crevice in a substrate;
      a rigid and pointed tip attached at the first end of the body; and
      at least one tail attached at the second end of the body, with the tail curved to provide support against the substrate to facilitate drilling;
   distributing the device onto the substrate in an environment having varying humidity, whereby, in response to changes in humidity, the coiling and uncoiling of
device causes the device to:

search for a crevice in the substrate;

locate the crevice;

drill the device into the crevice; and establish the device in the crevice.

14. The method of claim 13, wherein the device coils in response to low humidity and uncoils in response to high humidity.

15. The method of claim 13, wherein the transported payload is a compound selected from the group consisting of one or more of seeds, fertilizer, and microorganisms.

16. The method of claim 13, wherein the transported payload is at least one sensor for sensing, collecting, processing and transmitting information relating to the environment around the device.

17. The method of claim 13, wherein the transported payload is at least one of a marker or indicator to aid in locating the device.

\* \* \* \* \*